(12) United States Patent
Lee et al.

(10) Patent No.: US 10,172,169 B2
(45) Date of Patent: Jan. 1, 2019

(54) METHOD AND DEVICE FOR CONTROLLING DEVICE BY USING BLUETOOTH TECHNOLOGY

(71) Applicant: LG ELECTRONICS INC., Seoul (KR)

(72) Inventors: Minsoo Lee, Seoul (KR); Younghwan Kwon, Seoul (KR); Jingu Choi, Seoul (KR); Jaeho Lee, Seoul (KR)

(*) Notice: Subject to any disclaimer, the term of this patent is extended or adjusted under 35 U.S.C. 154(b) by 0 days.

(21) Appl. No.: 15/510,974

(22) PCT Filed: Sep. 14, 2015

(86) PCT No.: PCT/KR2015/009631
§ 371 (c)(1),
(2) Date: Mar. 13, 2017

(87) PCT Pub. No.: WO2016/039598
PCT Pub. Date: Mar. 17, 2016

(65) Prior Publication Data
US 2017/0353979 A1 Dec. 7, 2017

Related U.S. Application Data

(60) Provisional application No. 62/050,180, filed on Sep. 14, 2014.

(51) Int. Cl.
*H04W 76/10* (2018.01)
*H04W 8/24* (2009.01)
(Continued)

(52) U.S. Cl.
CPC ......... *H04W 76/10* (2018.02); *H04L 63/0272* (2013.01); *H04W 4/80* (2018.02);
(Continued)

(58) Field of Classification Search
CPC combination set(s) only.
See application file for complete search history.

(56) References Cited

U.S. PATENT DOCUMENTS

| 6,438,110 B1 * | 8/2002 | Rai | H04L 41/0896 370/254 |
|---|---|---|---|
| 2006/0165035 A1 * | 7/2006 | Chandra | H04W 28/16 370/329 |

(Continued)

OTHER PUBLICATIONS

Bluetooth Specification Version 4.0.*

*Primary Examiner* — Yuwen Pan
*Assistant Examiner* — Zhitong Chen
(74) *Attorney, Agent, or Firm* — Birch, Stewart, Kolasch & Birch, LLP

(57) ABSTRACT

Disclosed is a method for controlling connection between a first device and a second device using Bluetooth by a control device including obtaining a first device information related to the first device from the first device, obtaining a second device information related to the second device from the second device, transmitting a connection request message for requesting connection with the second device to the first device based on the first device information and the second device information, and receiving a first response message including a result of connection with the second device in response to the connection request message.

11 Claims, 22 Drawing Sheets

(51) Int. Cl.
    *H04W 88/04*     (2009.01)
    *H04W 4/80*     (2018.01)
    *H04L 29/06*     (2006.01)
    *H04W 8/18*     (2009.01)
    *H04W 12/02*     (2009.01)

(52) U.S. Cl.
    CPC .............. *H04W 8/24* (2013.01); *H04W 12/02* (2013.01); *H04W 88/04* (2013.01); *H04W 8/18* (2013.01)

(56) References Cited

U.S. PATENT DOCUMENTS

| | | | |
|---|---|---|---|
| 2011/0082940 A1* | 4/2011 | Montemurro | H04W 76/023 709/227 |
| 2013/0073663 A1 | 3/2013 | Eldering | |
| 2013/0259230 A1 | 10/2013 | Polo et al. | |
| 2013/0316649 A1 | 11/2013 | Newham | |
| 2014/0094123 A1 | 4/2014 | Polo et al. | |
| 2014/0188348 A1 | 7/2014 | Gautama et al. | |
| 2014/0357269 A1* | 12/2014 | Zhou | H04W 8/005 455/434 |

\* cited by examiner

【FIG. 1】
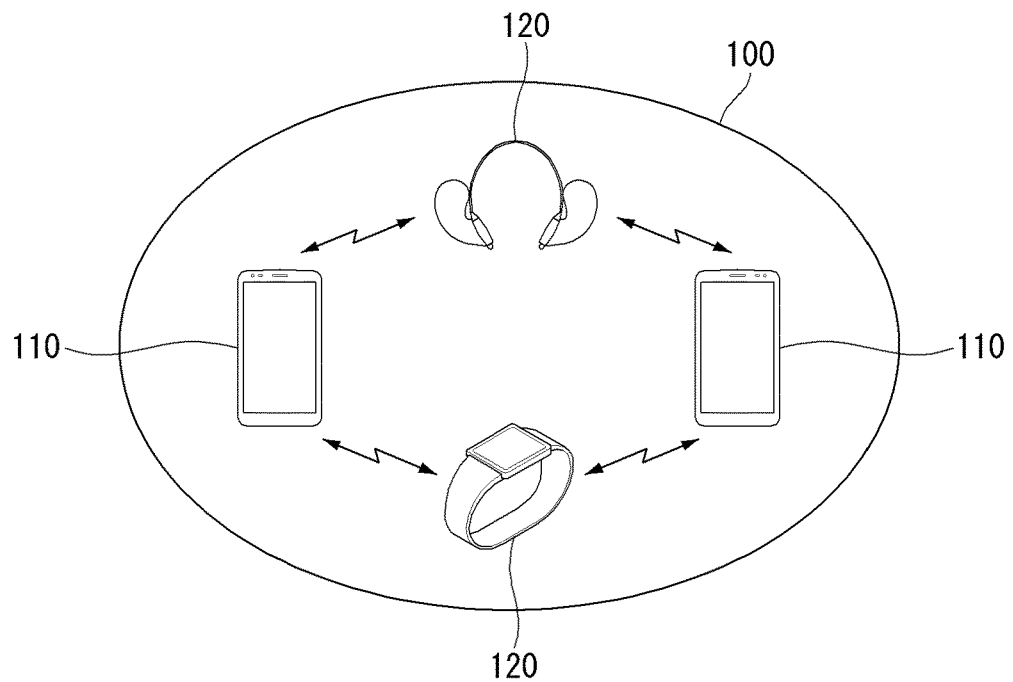

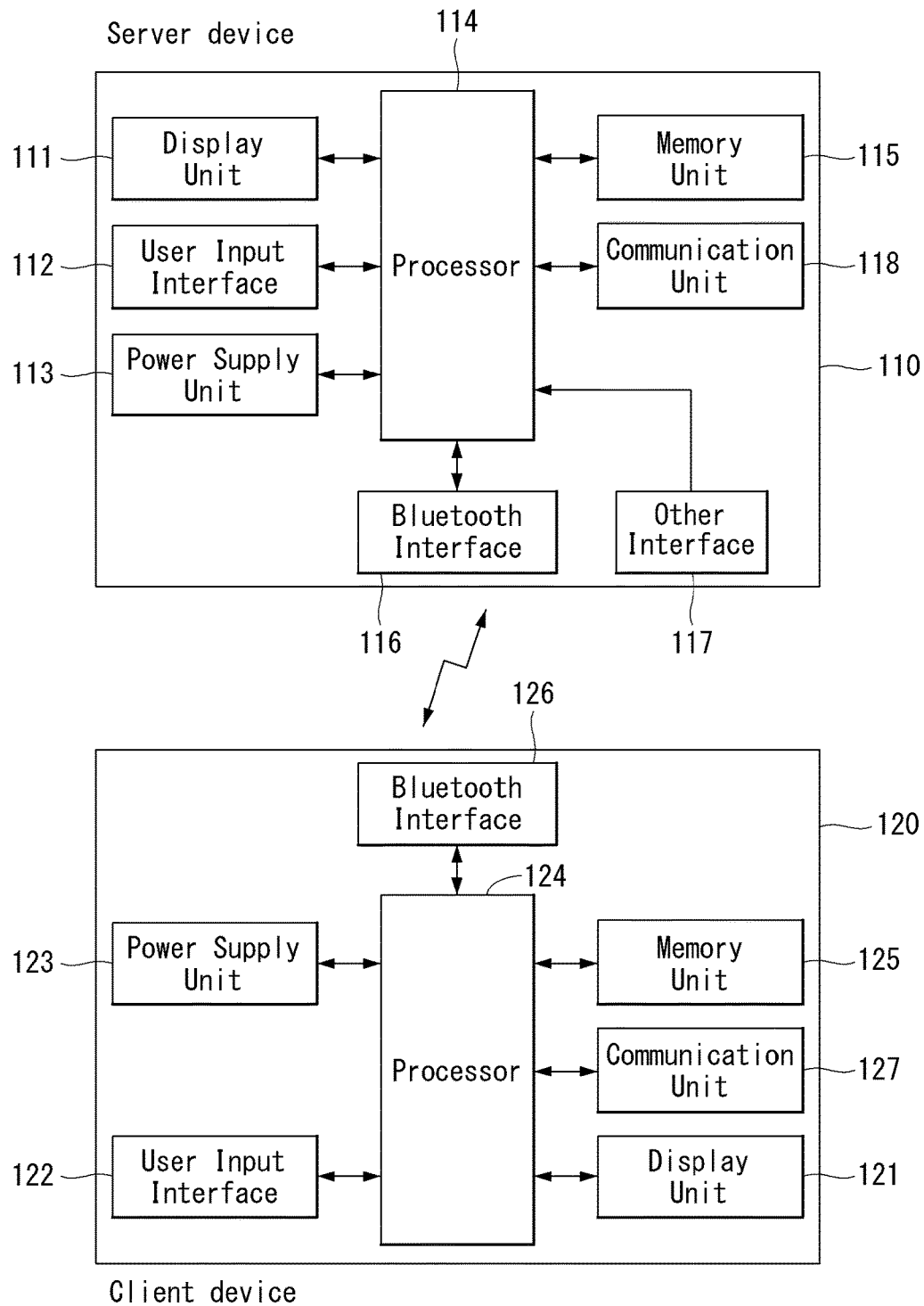
[FIG. 2]

[FIG. 3]
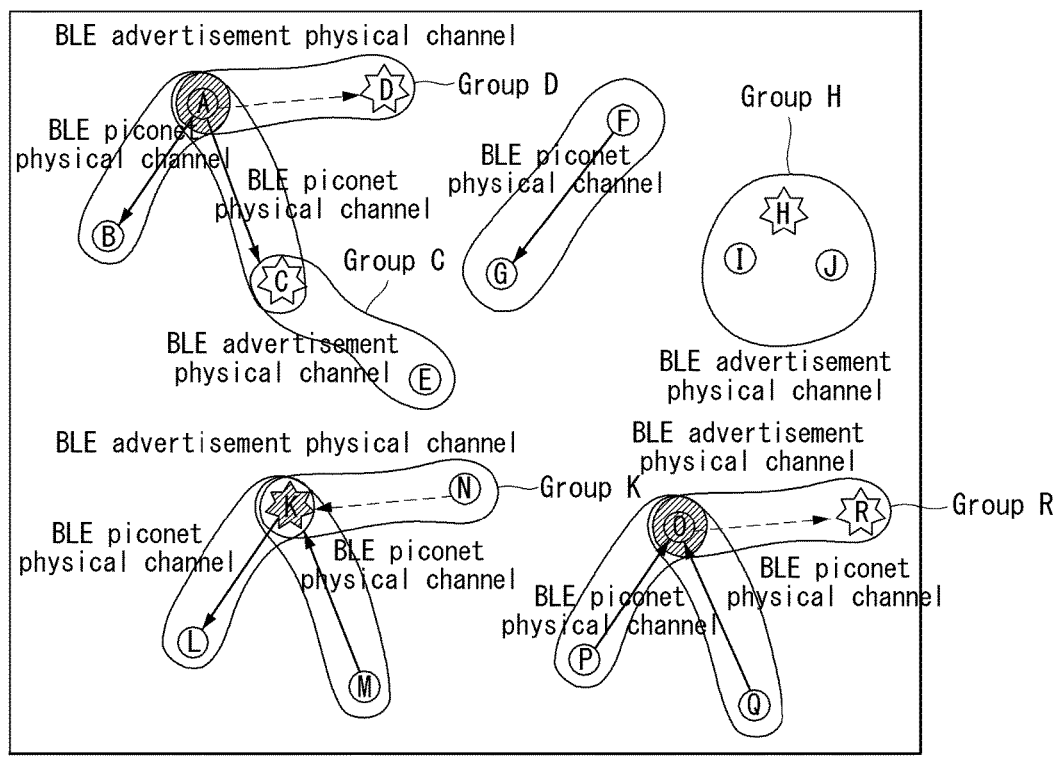

[FIG. 4]
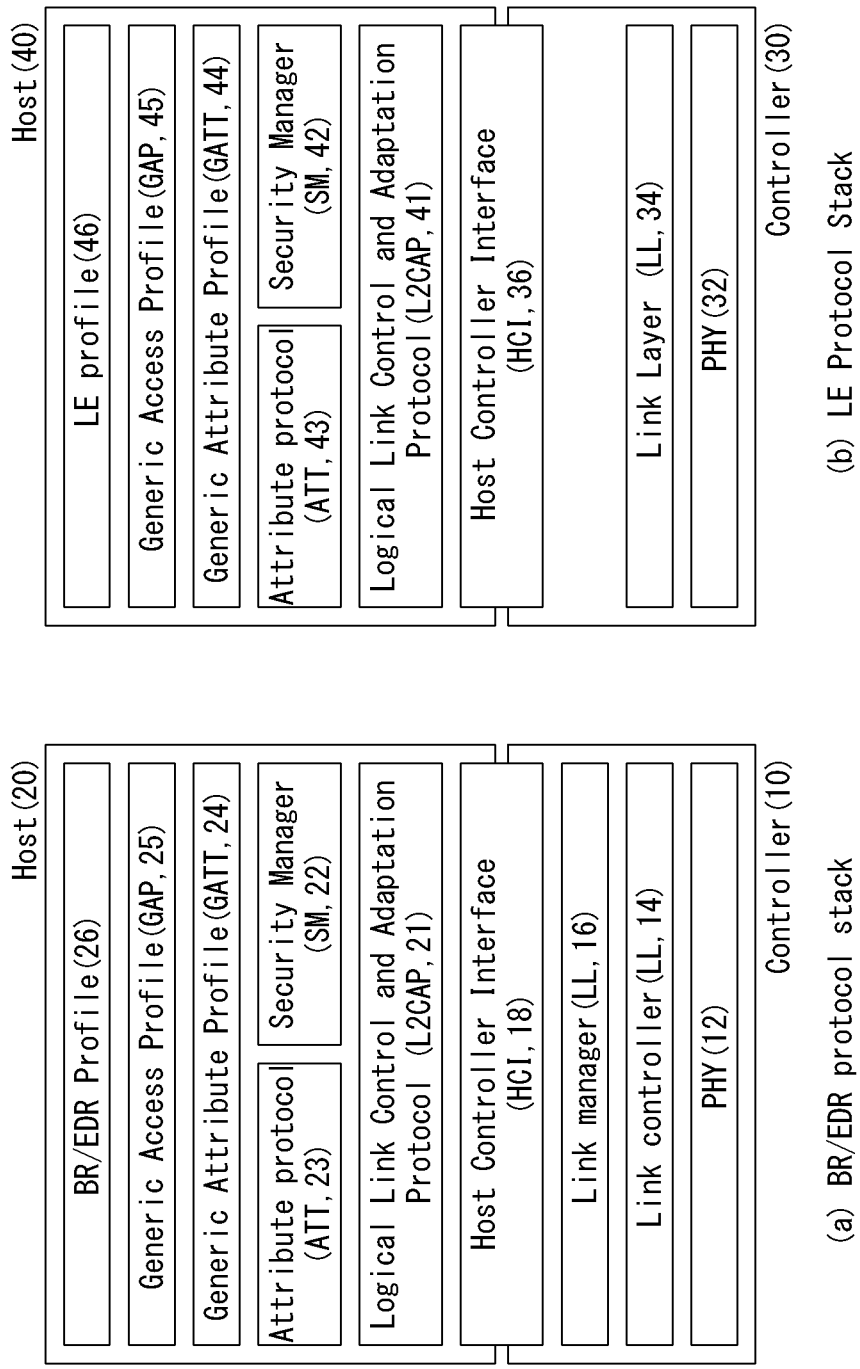

[FIG. 5]
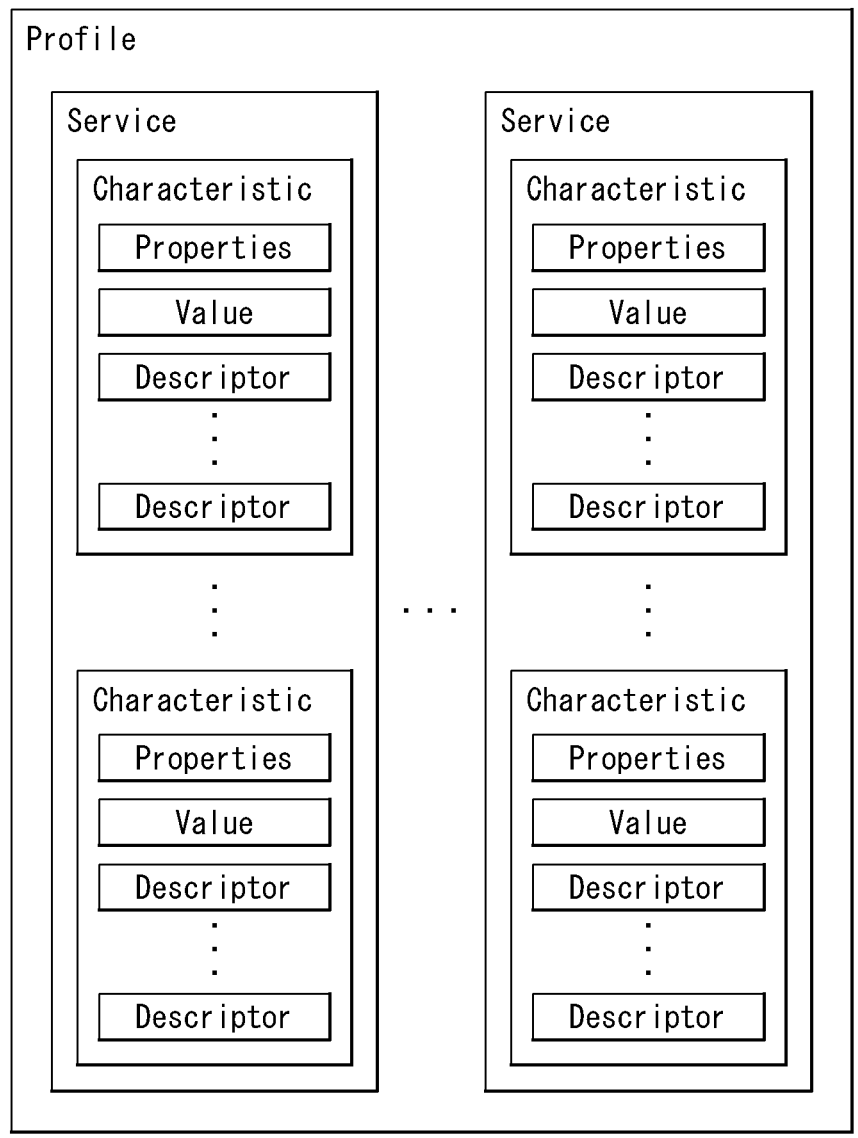

[FIG. 6]
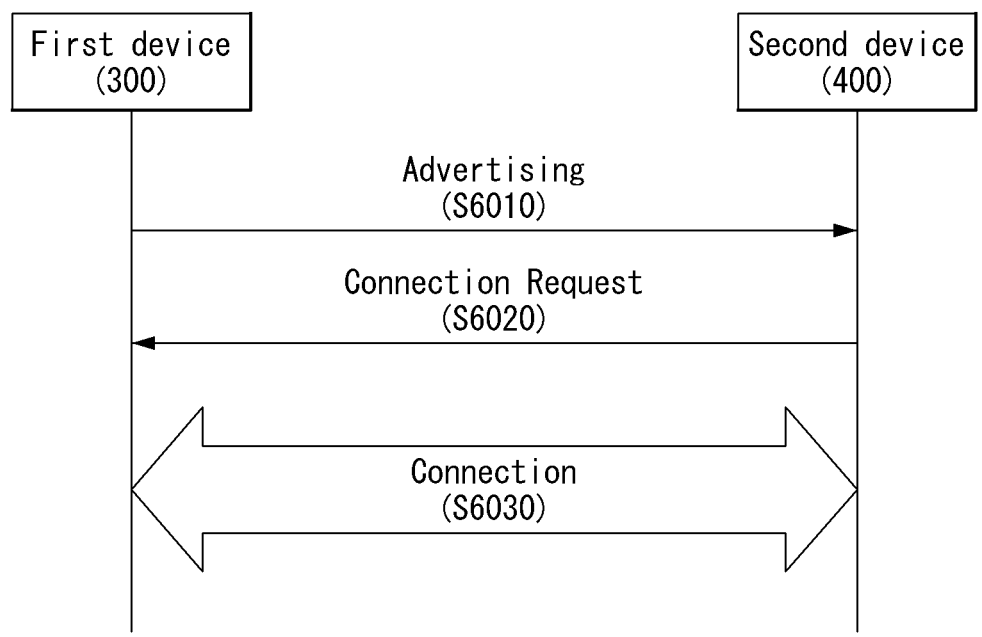

【FIG. 7】
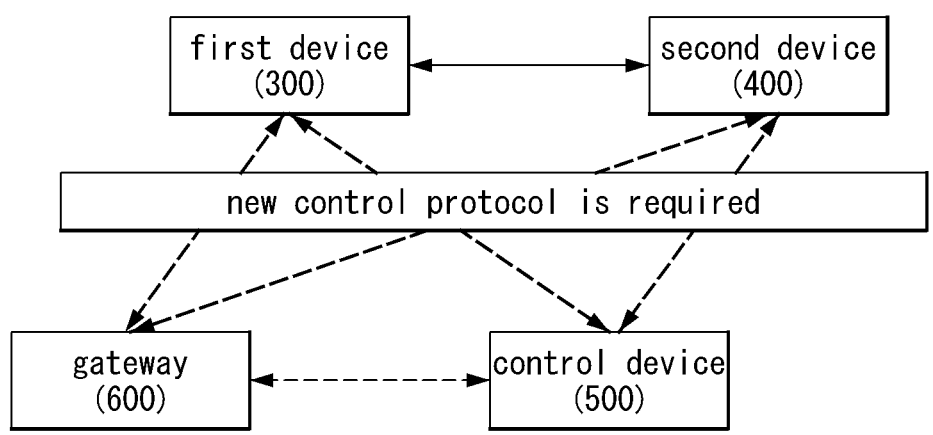

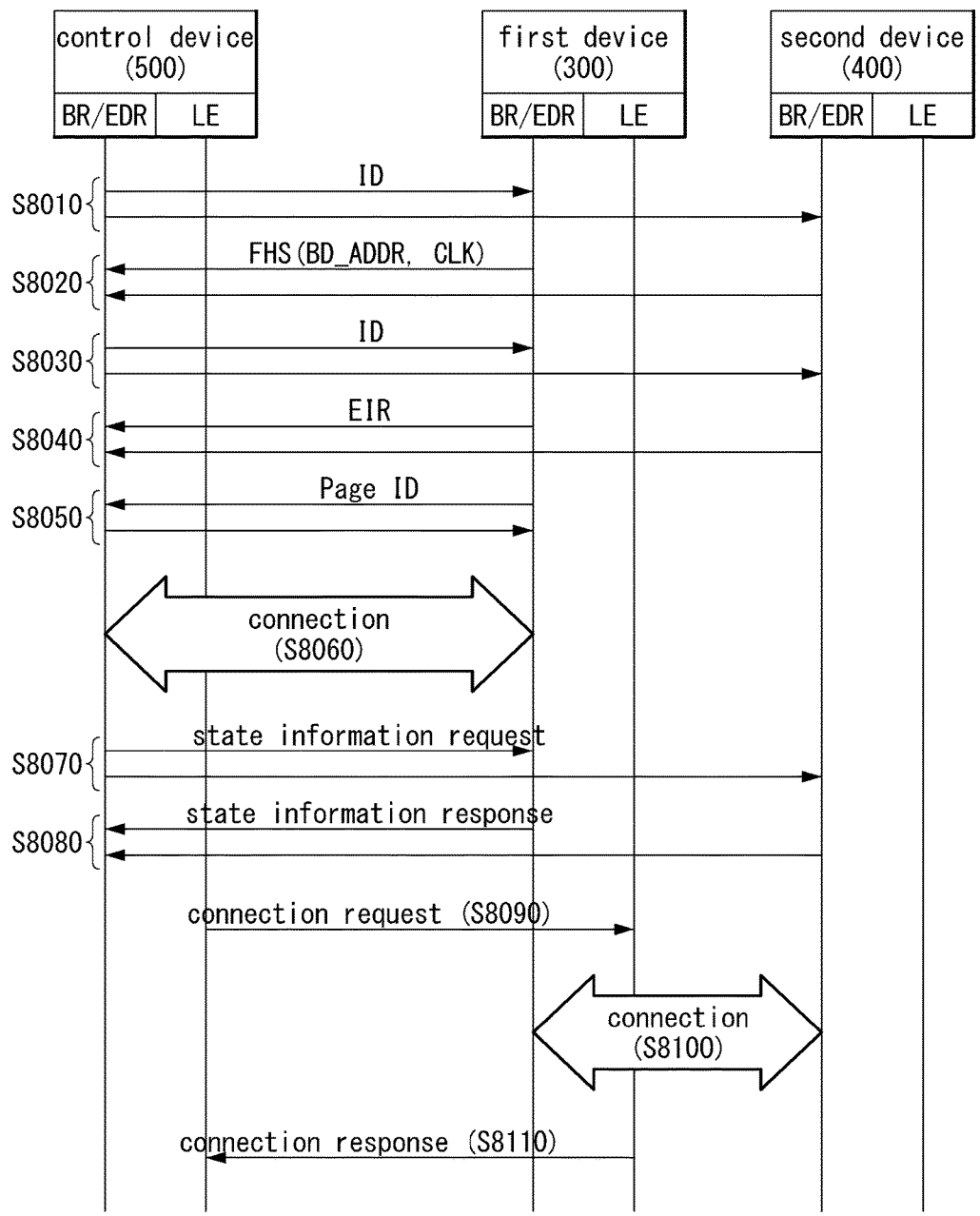
[FIG. 8]

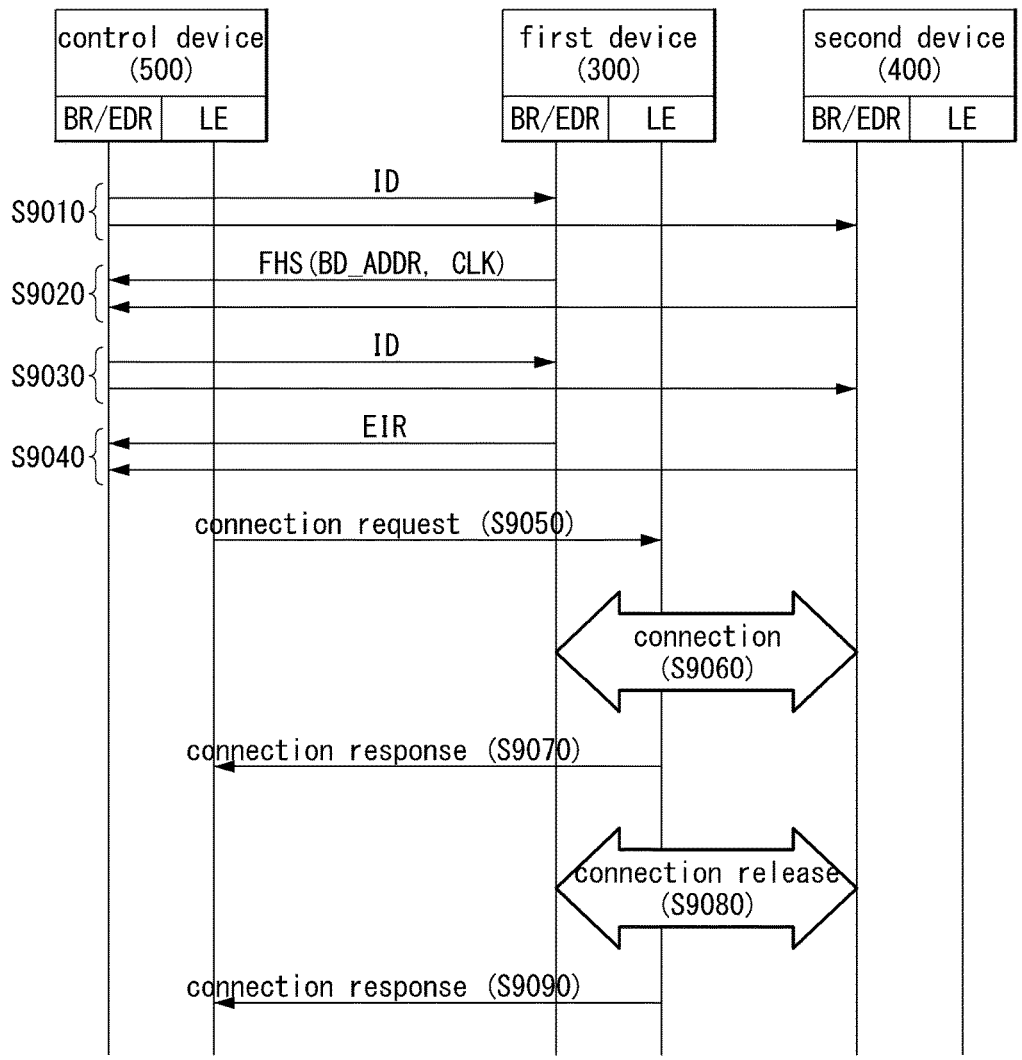

[FIG. 10]

| Data Type | Explanation |
|---|---|
| Destination_Dev | Device information of client device |
| Pairing Start Time | Start Time=hh:mm:ss<br>(Optional) When start time is not shown, time at which message is received is set as start time |
| Pairing End Time | Start Time=hh:mm:ss<br>(Optional) When start time is not shown, time at which transmission of message is finished is set as end time<br>End Time=hh:mm:ss |
| Scheduled Pairing | Pairing Start Time and Pairing End Time may be set as follows<br>Scheduled Pairing Options.<br>· Everyday<br>· Weekday<br>· Monday<br>· Tuesday<br>· Wednesday<br>· Thursday<br>· Friday<br>· Saturday<br>· Sunday |

[FIG. 11]
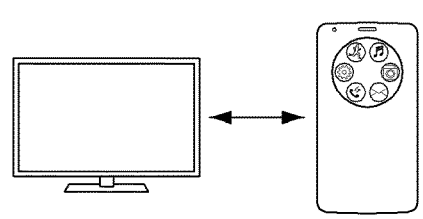
(a)
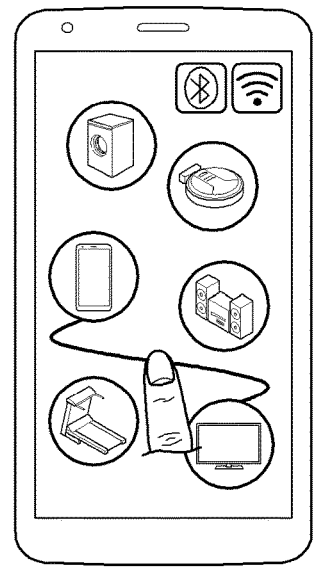
(b)
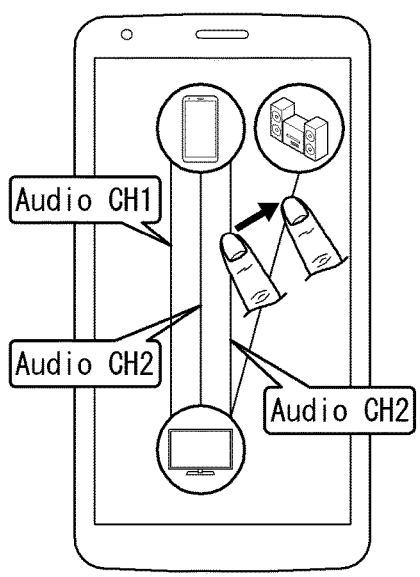
(c)
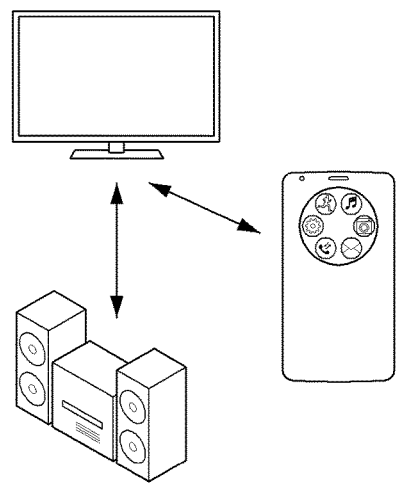
(d)

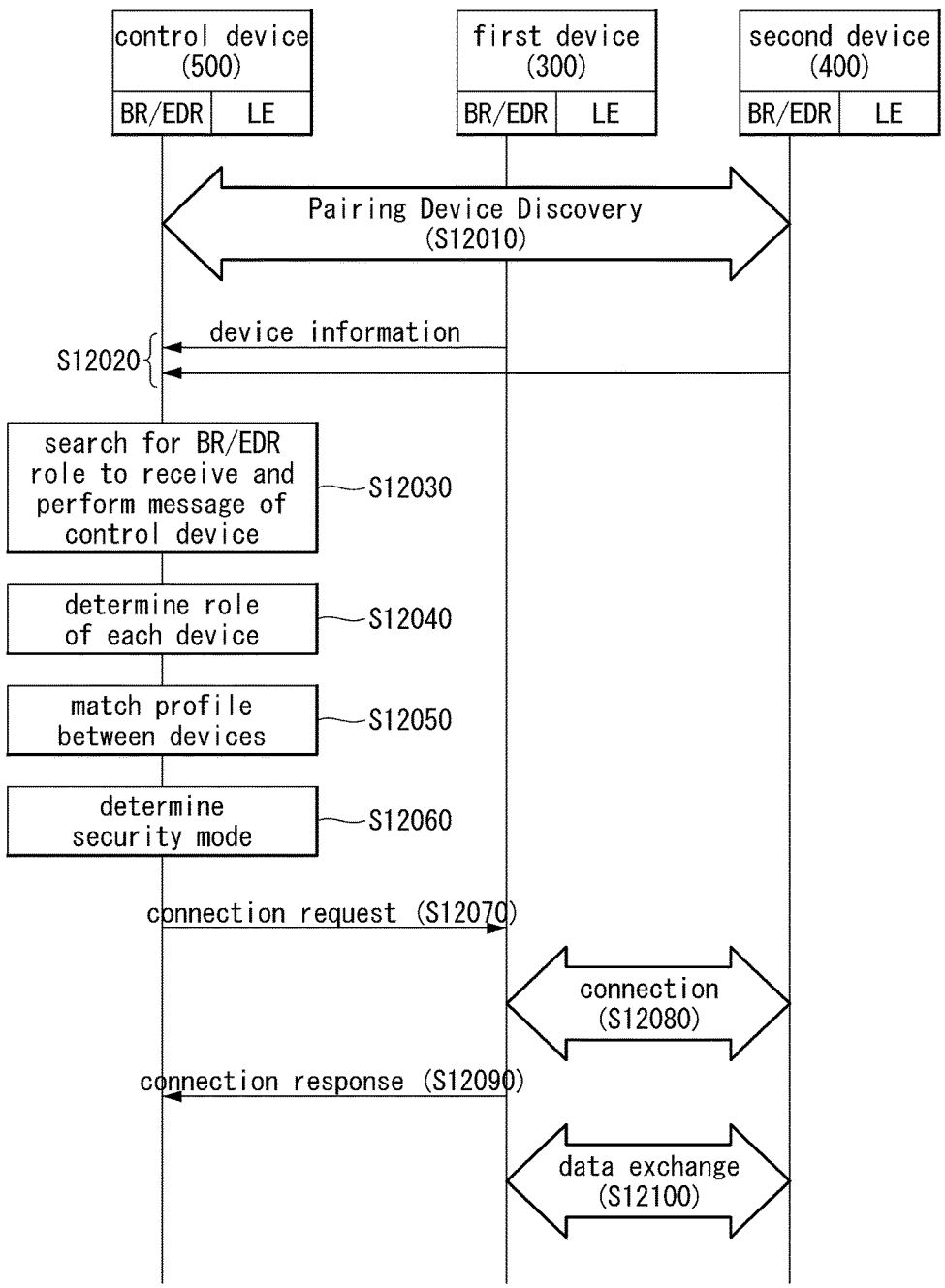

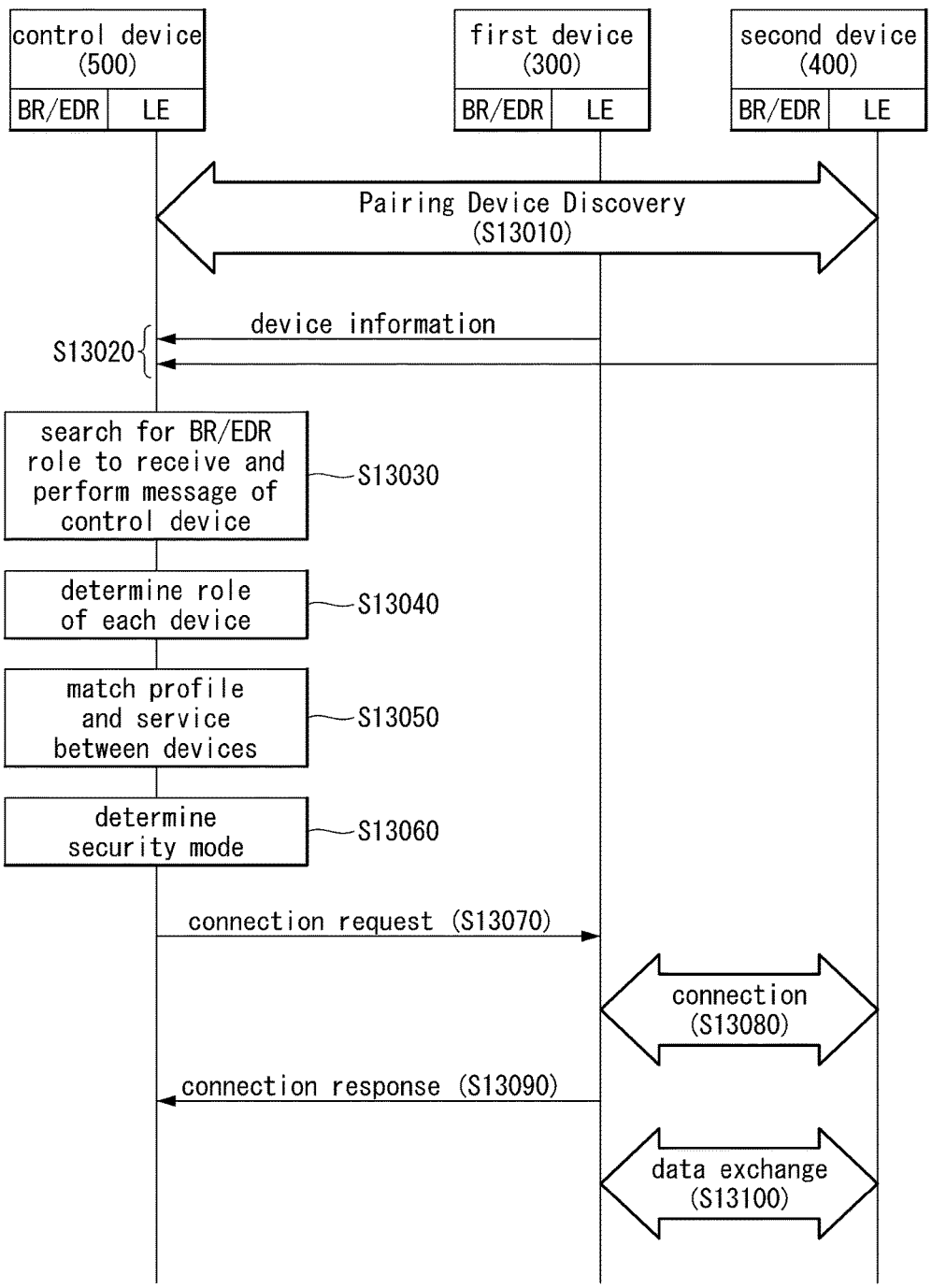
[FIG. 13]

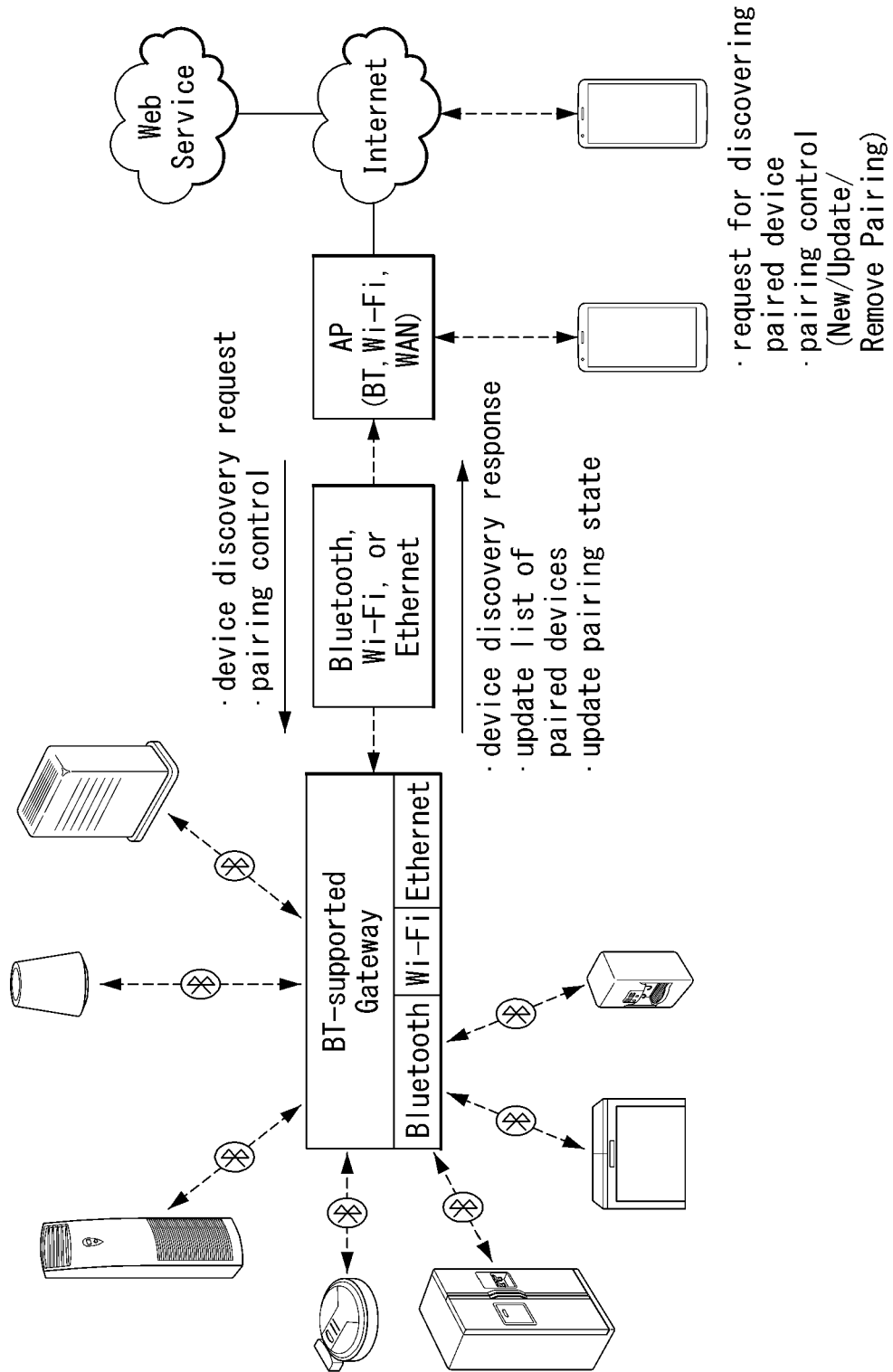
[FIG. 14]

[FIG. 15]
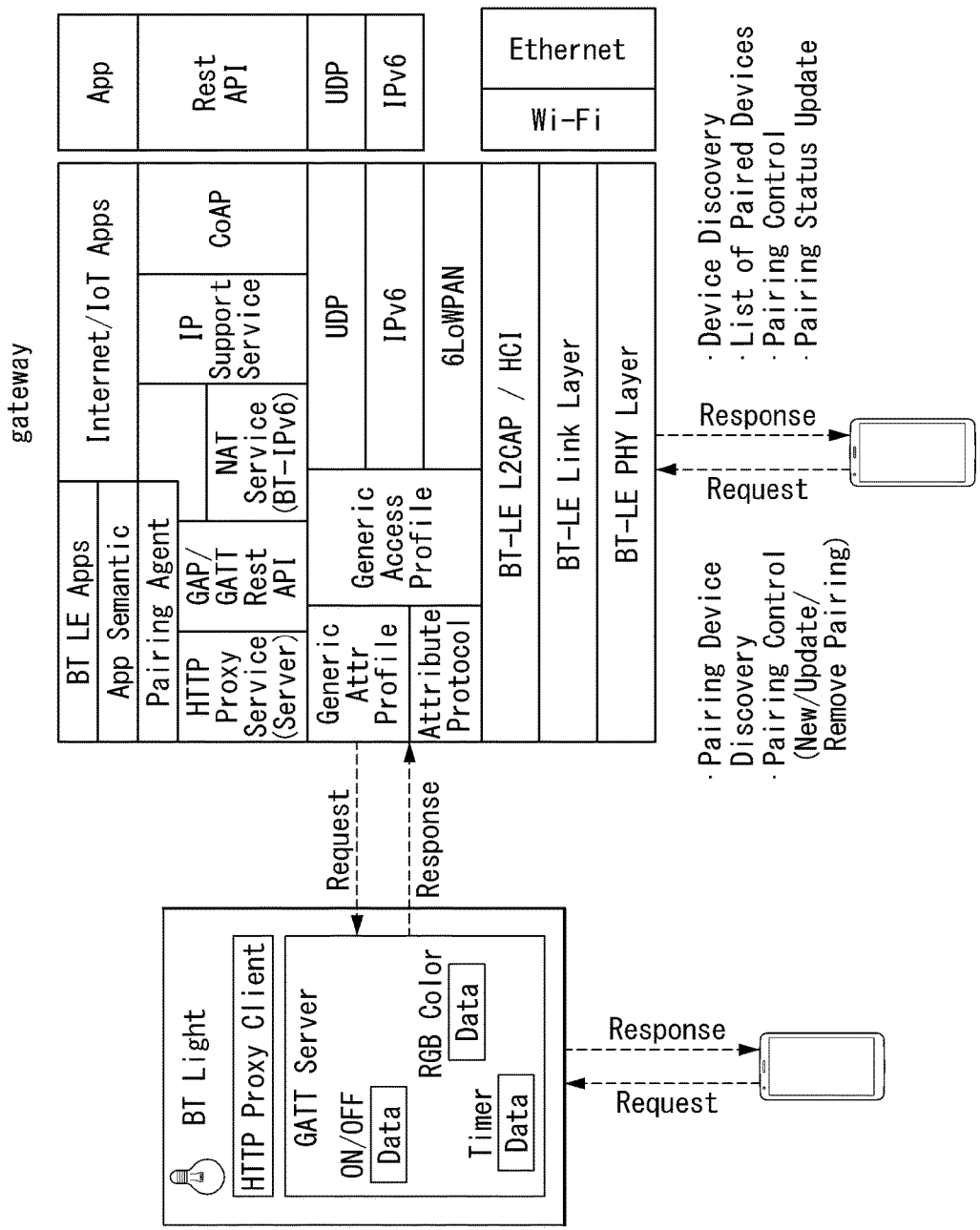

[FIG. 16]
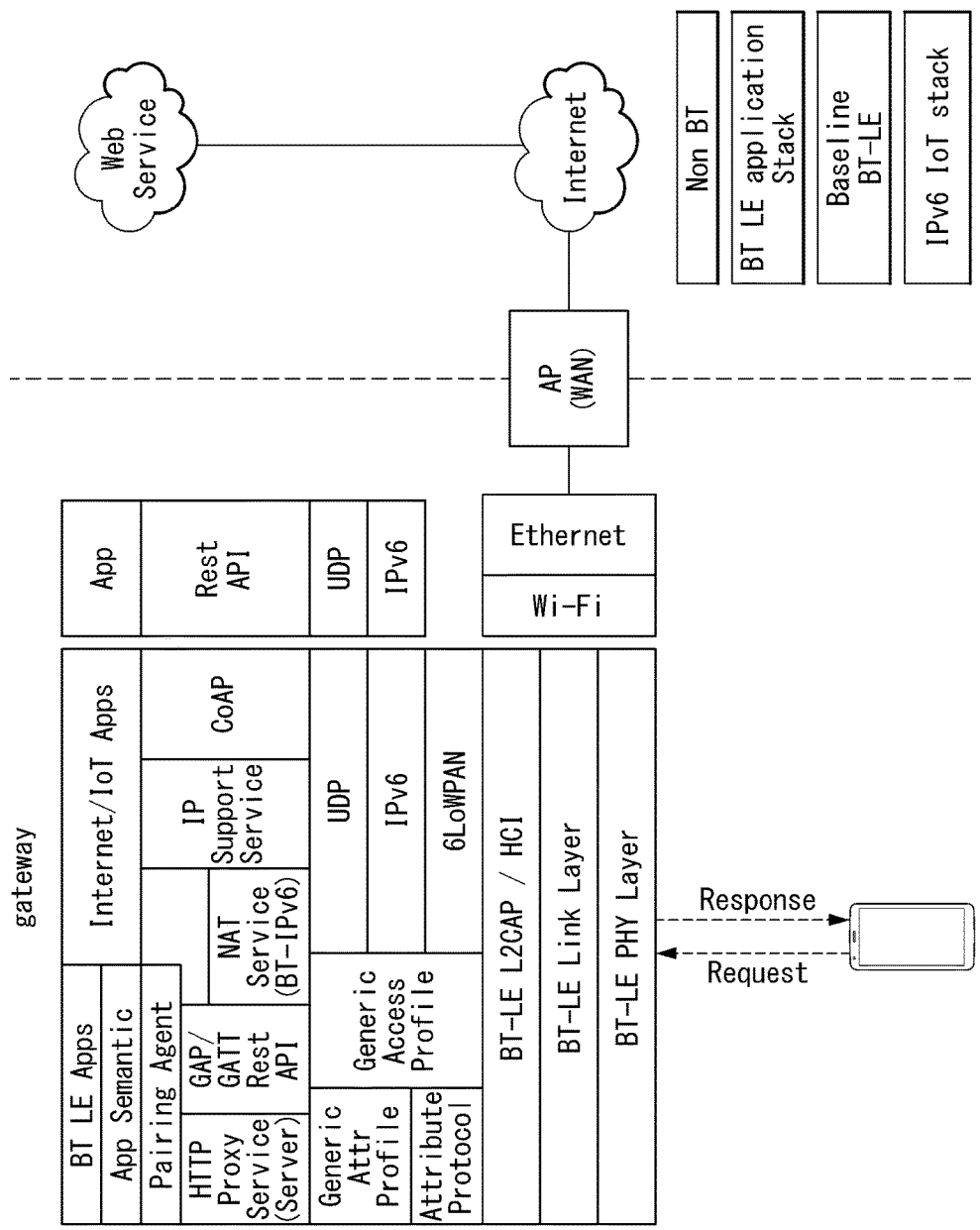

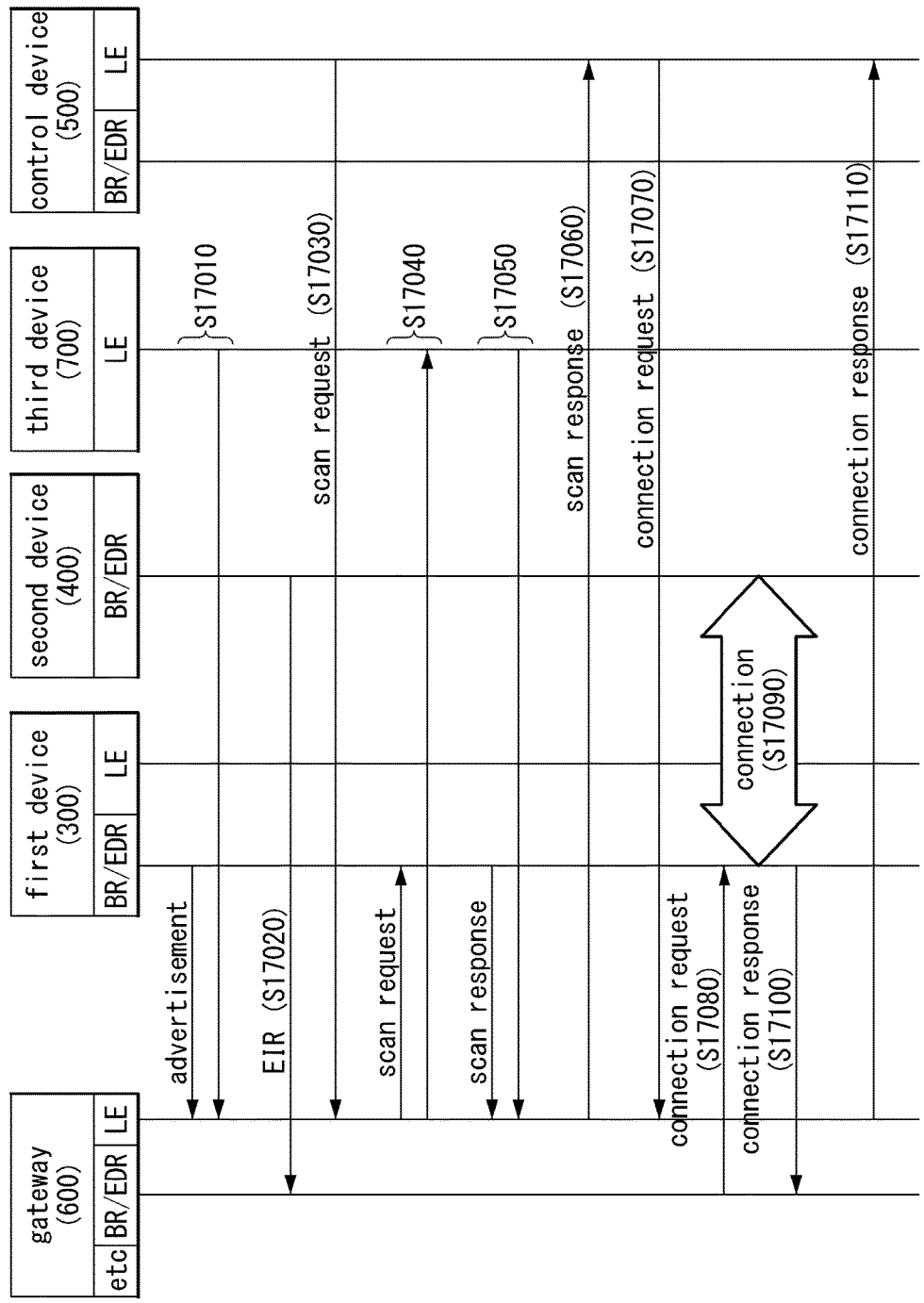
[FIG. 17]

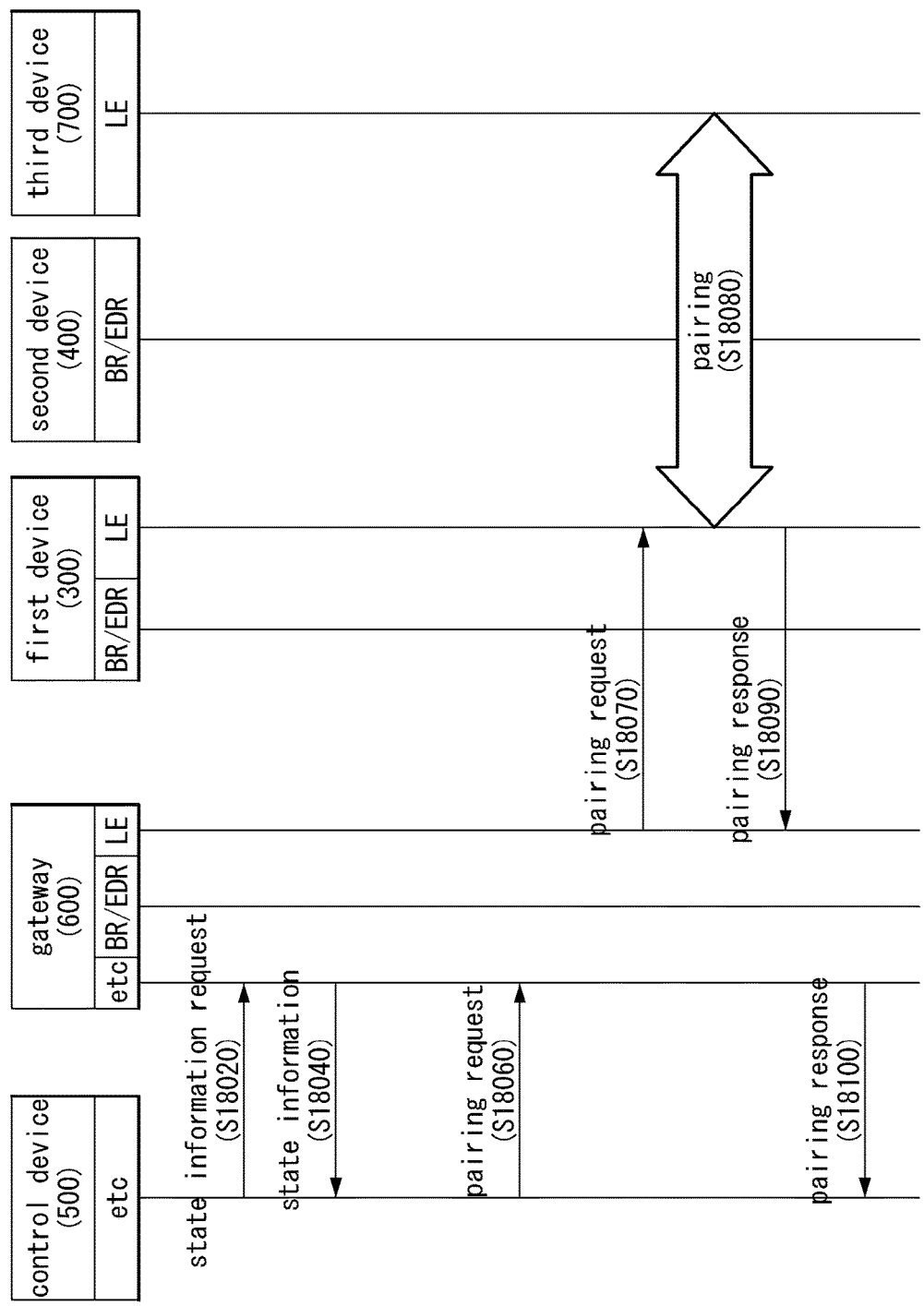

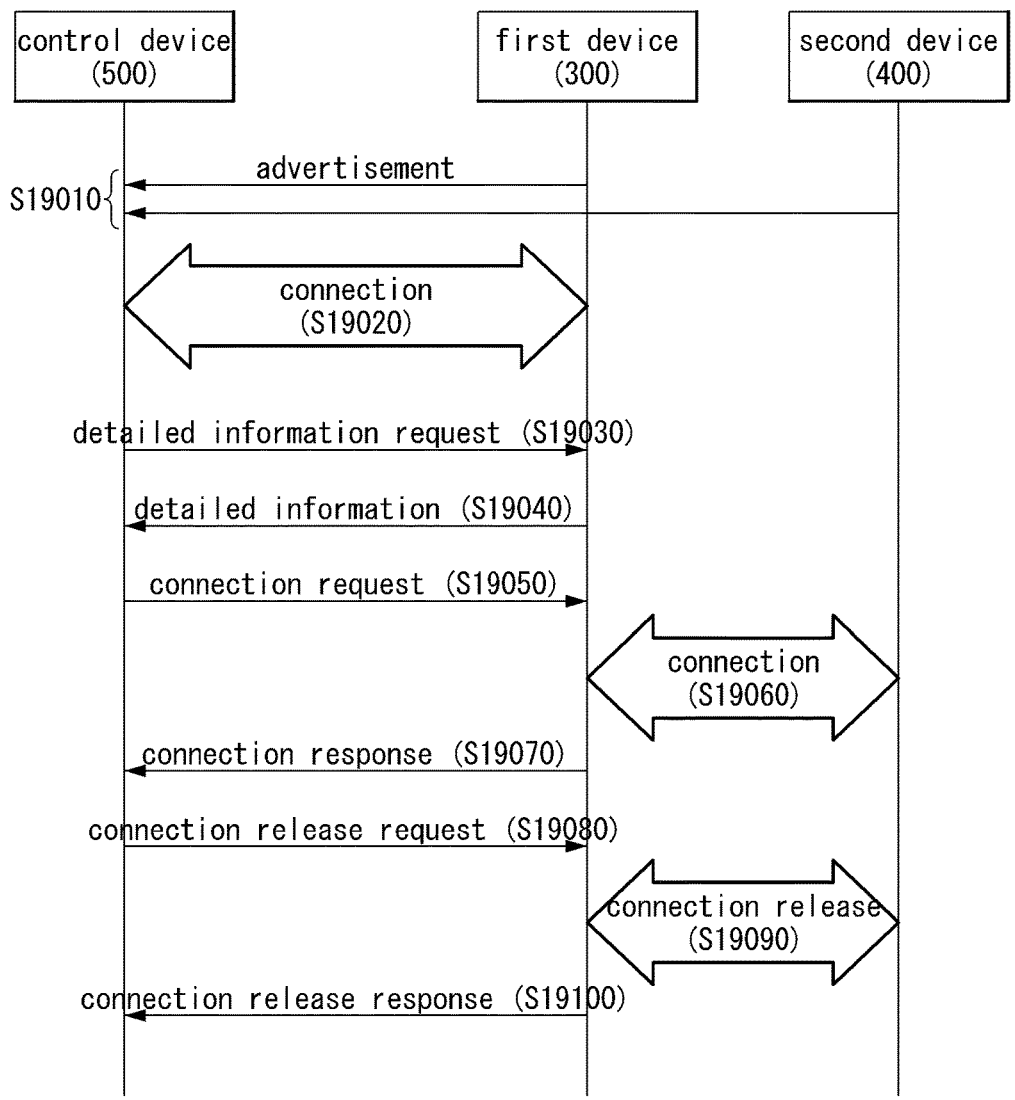
[FIG. 19]

[FIG. 20]
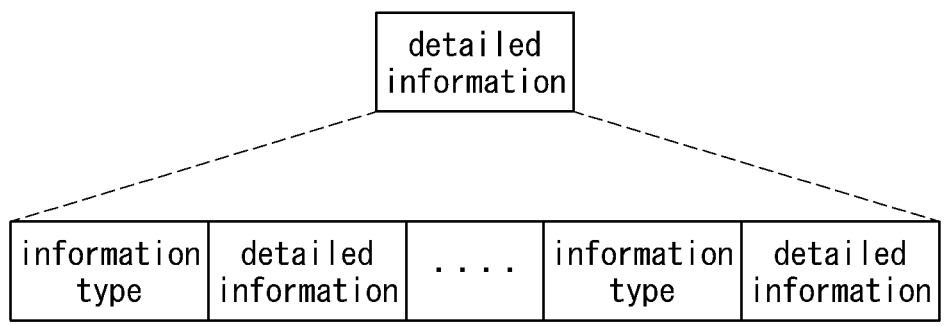

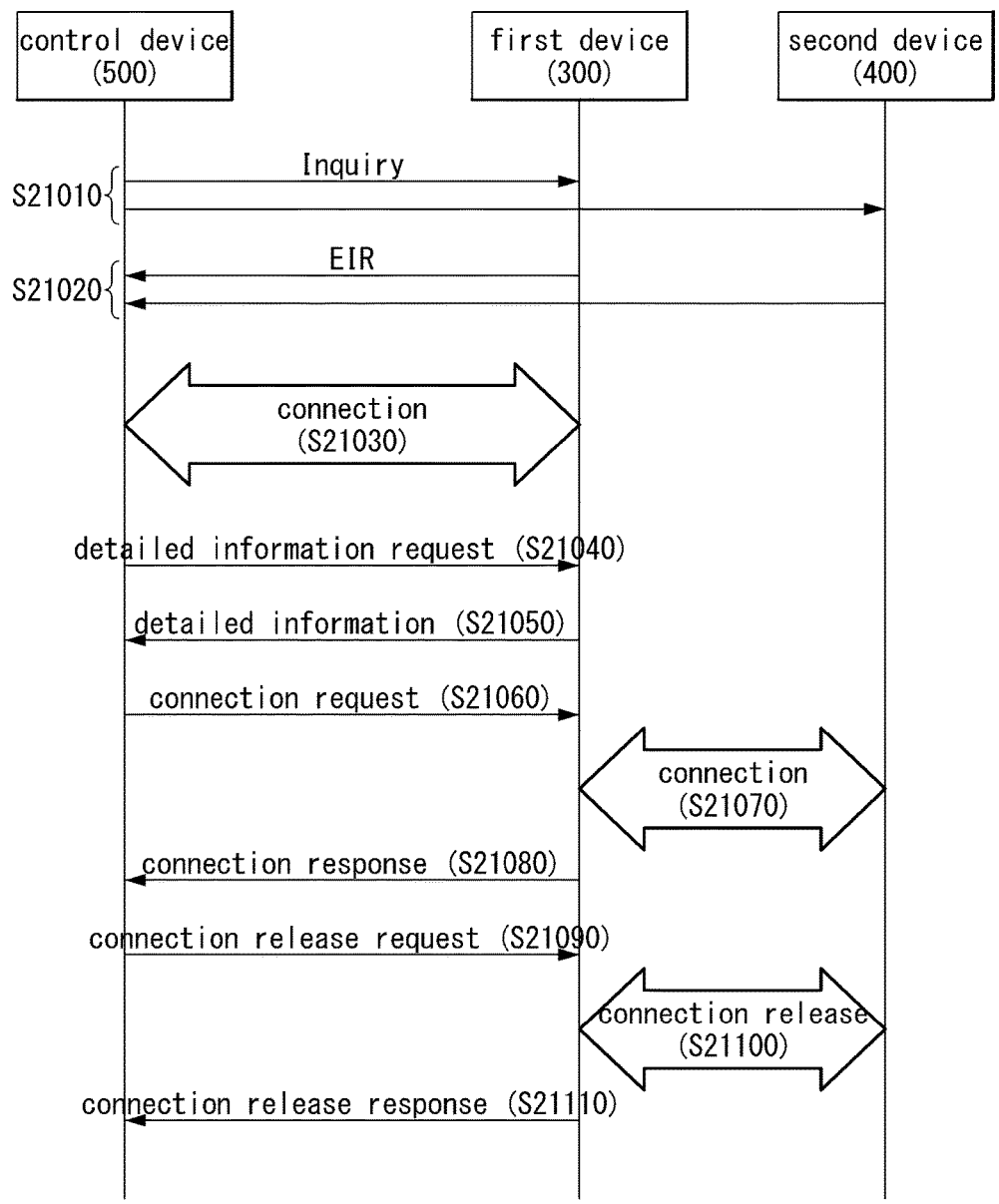
[FIG. 21]

【FIG. 22】
(a) 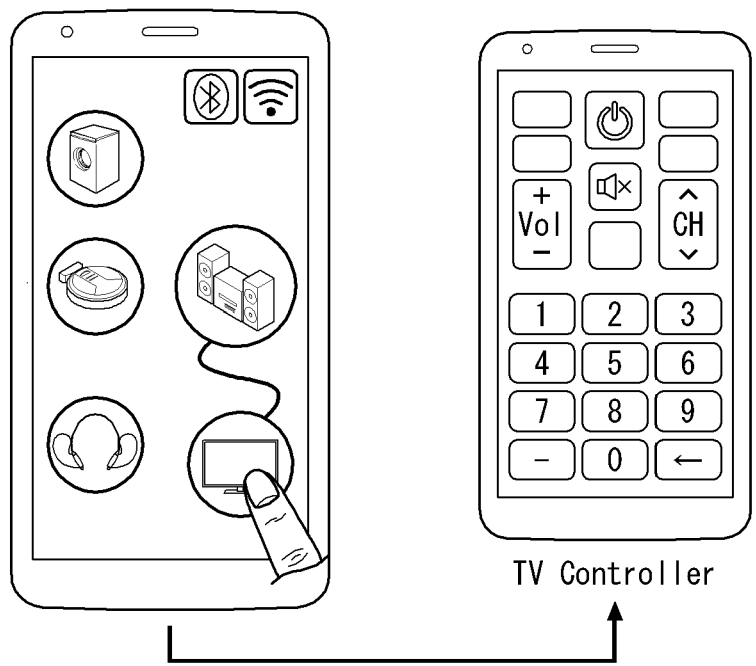
TV Controller
(b) 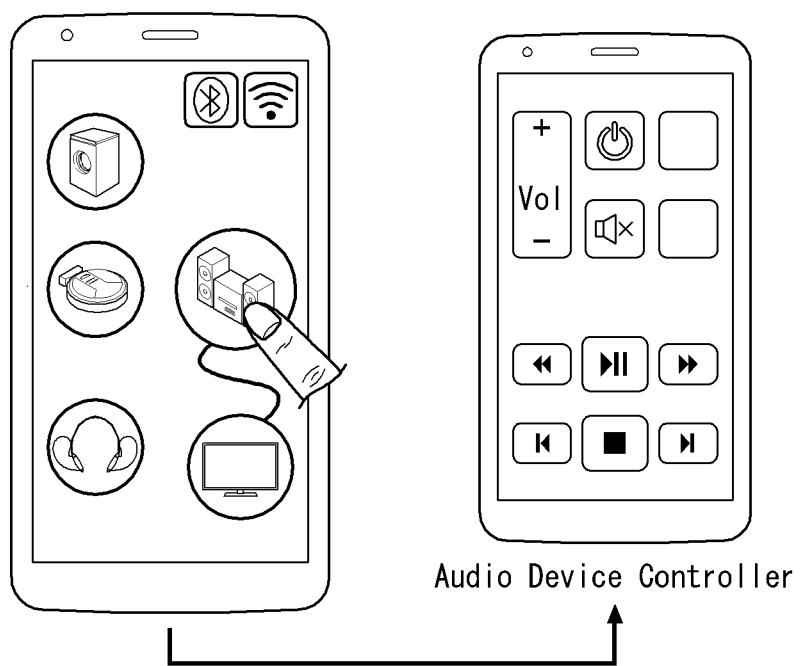
Audio Device Controller

METHOD AND DEVICE FOR CONTROLLING DEVICE BY USING BLUETOOTH TECHNOLOGY

CROSS REFERENCE TO RELATED APPLICATIONS

This application is the National Phase of PCT International Application No. PCT/KR2015/009631, filed on Sep. 14, 2015, which claims priority under 35 U.S.C. 119(e) to U.S. Provisional Application No. 62/050,180, filed on Sep. 14, 2014, all of which are hereby expressly incorporated by reference into the present application.

TECHNICAL FIELD

The present disclosure relates to a method and device for forming a connection between devices using Bluetooth as a near field technique in a wireless communication system, and more particularly, to a method and device for controlling a connection between devices using a Bluetooth basic rate/enhanced data rate (BR/EDR) or a Bluetooth low energy (BLE) technique.

BACKGROUND ART

Bluetooth is an NFC technology standard allowing various devices to be wirelessly connected in a near field to exchange data. In a case in which two devices intend to perform wireless communication using Bluetooth communication, a user may perform a procedure for discovering a Bluetooth device with which he or she wants to communicate and requesting a connection. In the present disclosure, a device may refer to an apparatus or an appliance.

Here, the user may discover a Bluetooth device according to a Bluetooth communication method intended to be used using the Bluetooth device, and subsequently perform a connection.

The Bluetooth communication method may be classified as a BR/EDR method and an LE method. The BR/EDR method may be termed Bluetooth Classic. The Bluetooth Classic method includes a Bluetooth technology led from Bluetooth 1.0 and a Bluetooth technology using an enhanced data rate (EDR) supported by Bluetooth 2.0 or a subsequent version.

A Bluetooth low energy (LE) technology applied, starting from Bluetooth 4.0, may stably provide information of hundreds of kilobytes (KB) at low power consumption. Such a Bluetooth low energy technology allows devices to exchange information with each other by utilizing an attribute protocol. The Bluetooth LE method may reduce energy consumption by reducing overhead of a header and simplifying an operation.

Among the Bluetooth devices, some products do not have a display or a user interface. Complexity of connection, management, control, and disconnection among various types of Bluetooth devices and Bluetooth device employing similar technologies has increased.

Bluetooth supports a high speed at relatively low power consumption and at relatively low cost. However, since a transmission distance thereof is 100 m at the maximum, and thus, Bluetooth is appropriately used within a limited space.

DISCLOSURE

Technical Problem

An aspect of the present disclosure provides a method for controlling a device using a Bluetooth low energy (BLE) technique.

Another aspect of the present disclosure provides a method for controlling connection of a device by a control device using a Bluetooth basic rate/enhanced data rate (BR/EDR) and a Bluetooth low energy (BLE) technique.

Another aspect of the present disclosure provides a method for obtaining information of devices and controlling connection of devices based on the obtained information of the devices by a control device using a BR/EDR and a BLE technique.

Another aspect of the present disclosure provides a method for controlling connection of controlled devices by a control device by determining roles of the controlled devices.

Another aspect of the present disclosure provides a method for controlling connection of other devices by a control device through a gateway supporting various network communication techniques.

Technical subjects of the present disclosure that may be obtained in the present disclosure are not limited to the foregoing technical subjects and any other technical subjects not mentioned herein may be easily understood by a person skilled in the art from the present disclosure and accompanying drawings.

Technical Solution

According to an aspect of the present disclosure, a method for controlling connection of a first device and a second device using a Bluetooth technique is provided.

In detail, a method for controlling connection between a first device and a second device using Bluetooth by a control device includes: obtaining a first device information related to the first device from the first device; obtaining a second device information related to the second device from the second device; transmitting a connection request message for requesting connection with the second device to the first device based on the first device information and the second device information; and receiving a first response message including a result of connection with the second device in response to the connection request message, wherein the first device information includes a first role information indicating a role of the first device or at least one of one or more first profile IDs indicating profiles supportable by the first device, and the second device information includes a second role information indicating a role of the second device or at least one of one or more second profile IDs indicating profiles supportable by the second device.

Also, in the present disclosure, the first device information may further include at least one of a type information indicating a type of the first device, a first bonding information indicating a bonding state of the first device, a first connection information indicating a connection state of the first device, or a first security mode information indicating a security mode supported by the first device, and the second device information may further include at least one of a type information indicating a type of the second device, a second bonding information indicating a bonding state of the second device, a second connection information indicating a connection state of the second device, or a second security mode information indicating a security mode supported by the second device.

Also, in the present disclosure, the method may further include: selecting one or more common profile IDs from among the one or more first profile IDs and the one or more second profile IDs.

Also, in the present disclosure, the connection request message may include one or more common profile IDs.

Also, in the present disclosure, the method may further include: determining a third security mode information based on the first security mode information and the second security mode information.

Also, in the present disclosure, the connection request message may further include the third security mode information.

Also, in the present disclosure, the request message may further include start time information indicating a time at which the first device starts a connection procedure with the second device and an end time information indicating a time at which terminates the connection procedure.

Also, in the present disclosure, the method may further include: when connection of the first device and the second device terminates, receiving a second response message including state information indicating a connection state of the first device.

Also, in the present disclosure, the method may be performed through Bluetooth basic rate/enhanced data rate (BR/EDR) or Bluetooth low energy (BLE).

According to another aspect of the present disclosure, a device includes: a communication unit performing the exterior wirelessly or wiredly; and a processor functionally connected to the communication unit, wherein the processor performs control to obtain a first device information related to the first device from the first device, obtain a second device information related to the second device from the second device, transmit a connection request message for requesting connection with the second device to the first device based on the first device information and the second device information, and receive a first response message including a result of connection with the second device in response to the connection request message, wherein the first device information includes a first role information indicating a role of the first device or at least one of one or more first profile IDs indicating profiles supportable by the first device, and the second device information includes a second role information indicating a role of the second device or at least one of one or more second profile IDs indicating profiles supportable by the second device.

Also, in the present disclosure, the first device information may further include at least one of a type information indicating a type of the first device, a first bonding information indicating a bonding state of the first device, a first connection information indicating a connection state of the first device, or a first security mode information indicating a security mode supported by the first device, and the second device information may further include at least one of a type information indicating a type of the second device, a second bonding information indicating a bonding state of the second device, a second connection information indicating a connection state of the second device, or a second security mode information indicating a security mode supported by the second device.

Also, in the present disclosure, the processor may perform control to select one or more common profile IDs from among the one or more first profile IDs and the one or more second profile IDs.

Also, in the present disclosure, the connection request message may include one or more common profile IDs.

Also, in the present disclosure, the processor may perform control to determine a third security mode information based on the first security mode information and the second security mode information.

Also, in the present disclosure, the connection request message may further include the third security mode information.

Also, in the present disclosure, the request message may further include start time information indicating a time at which the first device starts a connection procedure with the second device and an end time information indicating a time at which the first device terminates the connection procedure.

Also, in the present disclosure, when connection of the first device and the second device terminates, the processor may perform control to receive a second response message including state information indicating a connection state of the first device.

Also, in the present disclosure, the processor may perform controlling through Bluetooth basic rate/enhanced data rate (BR/EDR) or Bluetooth low energy (BLE).

Advantageous Effects

In the method for controlling a device using a Bluetooth basic rate/enhanced data rate (BR/EDR) or a Bluetooth low energy (BLE) technique according to an embodiment of the present disclosure, connection between devices may be controlled through a control device.

Also, according to the present disclosure, a control device may control connection of controlled devices by determining roles of the controlled devices using a Bluetooth technique.

Also, according to the present disclosure, profile information supported by devices is obtained using a Bluetooth technique and connection of devices supporting the same profile may be may be controlled.

Also, according to the present disclosure, when profiles supported by devices are different, the devices are controlled not to attempt connection using a Bluetooth technique, whereby unnecessary resource consumption may be reduced.

Also, according to the present disclosure, the control device may control connection of a plurality of devices through a gateway supporting a plurality of wireless network communication techniques.

Also, according to the present disclosure, the control device may control connection of a plurality of devices through a wireless network communication technique allowing wide area communication even from the outside.

It will be appreciated by persons skilled in the art that that the effects that could be achieved with the present disclosure are not limited to what has been particularly described hereinabove and other advantages of the present disclosure will be more clearly understood by a person skilled in the art to which the present disclosure pertains, from the following detailed description.

DESCRIPTION OF DRAWINGS

FIG. 1 is a schematic view illustrating an example of a wireless communication system using a Bluetooth low energy technology to which the present invention is applicable.

FIG. 2 is an internal block diagram of an example of devices to which the present invention is applicable.

FIG. 3 is a view illustrating an example of a Bluetooth low energy topology.

FIG. 4 is a view illustrating an example of a Bluetooth communication architecture to which the present invention is applicable.

FIG. 5 is a view illustrating an example of a structure of a generic attribute profile (GATT) of Bluetooth low energy.

FIG. 6 is a flow chart illustrating a method for forming connection using Bluetooth low energy (LE) between devices.

FIG. 7 is a view schematically illustrating a method for controlling formation of connection between other devices through a control device, to which the present disclosure is applicable.

FIG. 8 is a flow chart illustrating an example of a method for controlling connection of devices through Bluetooth basic rate/enhanced data rate (BR/EDR) or a Bluetooth low energy (BLE) technique, to which the present disclosure is applicable.

FIGS. 9 and 10 are views illustrating an example of a method for scheduling a connection time of a device controlled through a Bluetooth BR/EDR and BLE technique and data types, to which the present disclosure is applicable.

FIG. 11 is a view illustrating an example of a method for controlling a plurality of devices through a single control device, to which the present disclosure is applicable.

FIG. 12 is a flow chart illustrating an example of a method for controlling connection of devices through a Bluetooth BR/EDR, to which the present disclosure is applicable.

FIG. 13 is a flow chart illustrating an example of a method for controlling connection of controlled devices by obtaining information of the devices by a control device, to which the present disclosure is applicable.

FIG. 14 is a view illustrating an example of a method for controlling connection of a plurality of devices through a gateway through a gateway, to which the present disclosure is applicable.

FIGS. 15 and 16 are views illustrating another example of a method for controlling connection of a plurality of devices by a control device through a gateway, to which the present disclosure is applicable.

FIG. 17 is a flow chart illustrating an example of a method for controlling a plurality of devices by a control device through a gateway using Bluetooth BR/EDR and BLE, to which the present disclosure is applicable.

FIG. 18 is a flow chart illustrating an example of a method for controlling a plurality of devices by a control device through a gateway using a wide area network technique, to which the present disclosure is applicable.

FIGS. 19 and 20 are views illustrating an example of a method for controlling connection of devices through BLE and a data format, to which the present disclosure is applicable.

FIG. 21 is a flow chart illustrating another example of a method for controlling connection of devices through Bluetooth BR/EDR, to which the present disclosure is applicable.

FIG. 22 is a view illustrating an example of a method for controlling devices using Bluetooth BR/EDR or BLE, to which the present disclosure is applicable.

BEST MODES

The aforementioned objects, features and advantages of the present invention will become more apparent through the following detailed description with respect to the accompanying drawings. Hereinafter, the embodiments of the present invention will be described with reference to the accompanying drawings, in which like numbers refer to like elements throughout the specification. In describing the present invention, a detailed description of known techniques associated with the present invention unnecessarily obscure the gist of the present invention, it is determined that the detailed description thereof will be omitted.

Hereinafter, a terminal related to the present invention will be described in detail with reference to the accompanying drawings. In the following description, usage of suffixes such as 'module', 'part' or 'unit' used for referring to elements is given merely to facilitate explanation of the present invention, without having any significant meaning by itself.

FIG. 1 is a schematic view illustrating an example of a wireless communication system using a Bluetooth low energy technology to which the present invention is applicable.

A wireless communication system 100 includes at least one server device 120 and at least one client device 110.

The server device and the client device perform Bluetooth communication using a Bluetooth low energy (BLE) technology.

First, compared with a Bluetooth basic rate/enhanced data rate (BR/EDR), the BLE technology has a relatively small duty cycle, may be produced at low cost, and significantly reduce power consumption through a low data rate, and thus, it may operate a year or longer when a coin cell battery is used.

Also, in the BLE technology, an inter-device connection procedure is simplified and a packet size is designed to be small compared with the Bluetooth BR/EDR technology.

In the BLE technology, (1) the number of RF channels is forty, (2) a data rate supports 1 Mbps, (3) topology has a scatternet structure, (4) latency is 3 ms, (5) a maximum current is 15 mA or lower, (6) output power is 10 mW (10 dBm) or less, and (7) the BLE technology is commonly used in applications such as a clock, sports, healthcare, sensors, device control, and the like.

The server device 120 may operate as a client device in a relationship with other device, and the client device may operate as a server device in a relationship with other device. That is, in the BLE communication system, any one device may operate as a server device or a client device, or may operate as both a server device and a client device if necessary.

The client device 120 may also be called as data service device, slave device, slave, server, conductor, host device, gateway, sensing device, monitoring device, first device, or the like, and the server device 110 may also be called as master device, master, client, member, sensor device, sink device, collector, second device, third device, and the like.

The server device and the client device correspond to major components of the wireless communication system, and the wireless communication system may include components other than the server device and the client device.

The server device refers to a device which receives data from the client device and provides data to the client device in response when a corresponding request is received from the client device, through direct communication with the client device.

Also, in order to provide data information to the client device, the server device sends a notification message or an indication message to the client device in order to provide data information to the client device. Also, the server device receives a confirmation message corresponding to the indication message from the client device.

Also, in the process of transmitting and receiving notification, indication, and confirmation messages to and from the client device, the server device may provide data information to a user through a display unit or may receive a request input from the user through a user input interface.

Also, in the process of transmitting and receiving message to and from the client device, the server device may read data from a memory unit or may write new data to the corresponding memory unit.

Also, the single server device may be connected with a plurality of client devices, and may be easily re-connected with client devices using bonding information.

The client device 120 refers to a device which requests data information and data transmission from the server device.

The client device receives data through a notification message or an indication message from the server device, and when an indication message is received from the server device, the client device sends an acknowledgement message in response to the indication message.

Similarly, in the process of transmitting and receiving messages to and from the server device, the client device may also provide information to the user through a display unit or may receive an input from the user through a user input interface.

Also, in the process of transmitting and receiving messages with the server device, the client device may read data from a memory unit or may write new data to the corresponding memory unit.

Hardware components such as the display units, the user input interfaces, and the memory units of the server device and the client device will be described in detail with reference to FIG. 2.

Also, the wireless communication system may configure personal area networking (PAN) through the Bluetooth technology. For example, in the wireless communication system, a private piconet may be established between devices to quickly and safely exchange files, documents, and the like.

Also, a plurality of devices measuring exercising activities of human beings through a fitness equipment using a specific device have been presented, but a device transmitting measured exercising data through Bluetooth to show specific numerical values to users has not been introduced yet.

Thus, in order to solve the problems, the present disclosure proposes a method for measuring human's physical activity and transmitting and processing measured data through BLE to provide the same to a user.

FIG. 2 is an internal block diagram of an example of devices to which the present invention is applicable.

As illustrated in FIG. 2, a server device includes a display unit 111, a user input interface 112, a power supply unit 113, a processor 114, a memory unit 115, a Bluetooth interface 116, other interface 117, and a communication unit (or transceiver unit) 118.

The display unit 111, the user input interface 112, the power supply unit 113, the processor 114, the memory unit 115, the Bluetooth interface 116, other interface 117, and the communication unit 118 are functionally connected to each other to perform a method proposed in this disclosure.

Also, the client device includes a display unit 121, a user input interface 122, a power supply unit 123, a processor 124, a memory unit 125, a Bluetooth interface 126, and a communication unit (or transceiver unit) 128.

The display unit 121, the user input interface 122, the power supply unit 123, the processor 124, the memory unit 125, the Bluetooth interface 126, other interface 127, and the communication unit 128 are functionally connected to each other to perform a method proposed in this disclosure.

The Bluetooth interfaces 116 and 126 refer to units (or modules) able to transmit data such as a request/a response, a command, a notification, an indication/confirmation message between devices.

The memory units 115 and 126 are units implemented in various types of devices, in which various types of data are stored.

The processors 114 and 124 refer to modules controlling a general operation of the server device or the client device, which control requesting transmission of a message through the Bluetooth interface and other interface and processing a received message therethrough.

The processors 114 and 124 may also be termed a controller, a control unit, and the like.

The processors 114 and 124 may include an application-specific integrated circuit (ASIC), other chip set, a logic circuit and/or data processing unit.

The processors 114 and 124 control the communication units to receive an advertising message from the server device, control the communication unit to transmit a scan request message to the server device and receive a scan response message as a response to the scan request from the server device, and control the communication unit to transmit a connection request message to the server device in order to establish a Bluetooth connection with the server device.

Also, after the Bluetooth LE connection is established through the connection procedure, the processors 114 and 124 control the communication units to read or write data by using an attribute protocol from the server device The memory units 115 and 125 may include a read-only memory (ROM), a random access memory (RAM), a flash memory, a memory card, a storage medium and/or other storage device.

The communication units 118 and 127 may include a baseband circuit for processing a wireless signal. When an embodiment is implemented by software, the aforementioned technique may be implemented as a module (process, function, etc.) performing the aforementioned function. The module may be stored in a memory unit and may be executed by a processor.

The memory units 115 may be present within or outside of the processors 114 and 124, and may be connected to the processors 114 and 124 through various well-known units.

The display units 111 and 121 refer to modules providing status information of the devices, message exchange information, and the like, to the user through a screen.

The power supply units 113 and 123 refer to modules receiving external power or internal power and supplying power required for operations of the respective components under the control of the controllers 114 and 124.

As discussed above, in the BLE technology, a duty cycle is small and power consumption may be significantly reduced through a low data rate.

The user input interfaces 112 and 122 refer to modules providing a user input such as a screen button to the controllers to enable the user to control an operation of the devices.

FIG. 3 is a view illustrating an example of a Bluetooth low energy topology.

Referring to FIG. 3, a device A corresponds to a master in a piconet (piconet A, the shaded portion) having a device B and a device C as slaves.

Here, the piconet refers to an aggregation of devices in which any one of them is a mater and the other devices occupy a shared physical channel connected to the master device.

The BLE slaves do not share a common physical channel with the master. Each of the slaves communicates with the master trough a separate physical channel. There is another piconet (piconet F) having a master device F and a slave device G.

A device K is present in a scatternet K. Here, the scatternet refers to a group of piconets connected to other piconets.

The device K is a master of a device L and a slave of a device M.

A device O is also in the scatter net O. The device O is a slave of a device P and a slave of a device Q.

As illustrated in FIG. 2, five different device groups are present.

1. Device D is an advertiser and device A is an initiator (group D).
2. Device E is a scanner and Device C is an advertiser (group C).
3. Device H is an advertiser, and devices I and J are scanners (group H).
4. Device K is also an advertiser, and device N is an initiator (group K).
5. Device R is an advertiser, and device O is an initiator (group R).

The devices A and B use a single BLE piconet physical channel.

The devices A and C use another BLE piconet physical channel.

In group D, the device D advertises using an advertisement event connectable in an advertisement physical channel, and the device A is an initiator. The device A may establish a connection with the device D and add a device to the piconet A.

In group C, the device C advertises on an advertisement physical channel by using a certain type of an advertisement event captured by the scanner device E.

The group D and the group C may use different advertisement physical channels or different times in order to avoid collision.

In the piconet F, a single physical channel is present. The devices F and G use a single BLE piconet physical channel. The device F is a master, and the device G is a slave.

In group H, a single physical channel is present. The devices H, I, and J use a single BLE advertisement physical channel. The device H is an advertiser, and the devices I and J are scanners.

In the scatternet K, the devices K and L use a single BLE piconet physical channel. The devices K and M use another BLE piconet physical channel.

In group K, the device K advertises by using an advertisement event connectable on an advertisement physical channel, and the device N is an initiator. The device N may establish a connection with the device K. Here, the device K may be a slave of two devices and a master of one device at the same time.

In the scatternet O, the devices O and P use a single BLE piconet physical channel. The devices O and Q use another BLE piconet physical channel.

In group R, the device R advertises by using an advertisement event connectable on an advertisement physical channel, and the device O is an initiator. The device O may establish a connection with the device R. Here, the device O may be a slave of two devices and a master of one device at the same time.

FIG. 4 is a view illustrating an example of a Bluetooth communication architecture to which the present invention is applicable.

Referring to FIG. 4, (a) of FIG. 4 illustrates an example of a protocol stack of a Bluetooth basic rate (BR/enhanced data rate (EDR) that supports GATT (Generic Attribute Profile), and (b) of FIG. 4 illustrates an example of a protocol stack of Bluetooth low energy (LE).

In detail, as illustrated in (a) of FIG. 4, the Bluetooth BR/EDR protocol stack may include an upper controller stack 10 and a lower host stack 20 with respect to a host controller interface (HCI) 18.

The host stack (or host module) 20 refers to hardware for transmitting or receiving a Bluetooth packet to and from a wireless transceiver module receiving a Bluetooth signal of 2.4 GHz, and is connected to a Bluetooth module, the controller stack 10, to control the Bluetooth module and performs an operation.

The host stack 20 may include a BR/EDR PHY layer 12, a BR/EDR baseband layer 14, and a link manager 16.

The BR/EDR PHY layer 12 is a layer transmitting and receiving a 2.4 GHz wireless signal, and in case of using Gaussian frequency shift keying (GFSK) modulation, the BR/EDR PHY layer 12 may transmit data by hopping 79 RF channels.

The BR/EDR baseband layer 14 serves to transmit a digital signal, selects a channel sequence hopping 1400 times per second, and transmits a time slot having a length of 625 us for each channel.

The link manager layer 16 controls a general operation (link setup, control, security) of a Bluetooth connection by utilizing a link manager protocol (LMP).

The link manager layer 16 may perform the following functions.

The link manager layer 16 may perform ACL/SCO logical transport, logical link setup, and control Detach: The link manager layer 16 stops connection and informs a counterpart device about the reason for stopping connection.

The link manager layer 16 performs power control and role switch.

The link manager layer 16 performs security (authentication, pairing, encryption) function.

The host controller interface layer 18 provides an interface between the host module and the controller module to allow the host to provide a command and data to the controller and allow the controller to provide an event and data to the host.

The host stack (or host module) 20 includes a logical link control and adaptive protocol (L2CAP) 21, an attribute protocol (ATT) 22, a generic attribute profile (GATT) 23, a generic access profile (GAP) 24, and a BR/EDR profile 25.

The logical link control and adaptive protocol (L2CAP) 21 may provide a two-way channels for transmitting data to a specific protocol or a profile.

The L2CAP 21 may multiplex various protocols and profiles provided from a Bluetooth higher position.

The L2CAP of the Bluetooth BR/EDR uses a dynamic channel, supports a protocol service multiplexer, retransmission, and a streaming mode, and provides segmentation and reassembly, per-channel flow control, and error control.

The generic attribute profile (GATT) 23 may operate as a protocol how the attribute protocol 22 is used in configuring services. For example, the generic attribute profile 23 may operate how ATT attributes are grouped together with services, and operate to describe features associated with services.

Thus, the GATT 23 and the ATT 22 may use features in order to describe status and services of a device and describe how the features are related and used.

The attribute protocol 22 and the BR/EDR profile 25 define a service (profile) using the Bluetooth BR/EDR and define an application protocol for exchanging data, and the generic access profile (GAP) 24 defines device discovering, connecting a device and security level.

As illustrated in (b) of FIG. 4, the Bluetooth LE protocol stack includes a controller stack 30 operable to process a wireless device interface for which timing is important, and a host stack 40 operable to process high level data.

First, the controller stack 30 may be implemented by using a communication module that may include a Bluetooth wireless device, for example, a processor module that may include a processing device such as a microprocessor.

The host stack may be implemented as part of an OS operated on a processor module or may be implemented as instantiation of a package on the OS.

In some examples, the controller stack and the host stack may be operated or executed on the same processing device within a processor module.

The controller stack 30 includes a physical layer (PHY) 32, a link layer (LL) 34, and a host controller interface (HCI) 36.

The physical layer (PHY) (wireless transceiver module 32), a layer for transmitting and receiving a 2.4 GHz wireless signal, uses a Gaussian frequency shift keying (GFSK) modulation and a frequency hopping technique including forty RF channels.

The link layer (LL) 34 serving to transmit or receive a Bluetooth packet provides a function of generating a connection between devices after performing an advertising and scanning function using three advertising channels, and exchanging data packets of a maximum of 257 bytes through thirty-seven data channels.

The host stack may include a generic access profile (GAP) 40, a logical link control and adaptation protocol (L2CAP) 41, a security manager (SM) 42, an attribute protocol (ATT) 43), a generic attribute profile (GATT) 44, a generic attribute profile (GAP) 45, and an LE profile 46. However, the host stack 40 is not limited thereto and may include various protocols and profiles.

The host stack multiplexes various protocols and profiles provided from a Bluetooth higher position by using the L2CAP.

First, the L2CAP 41 may provide a single two-way channel for transmitting data to a specific protocol or profile.

The L2CAP 41 may operate to multiplex data between higher layer protocols, segment and reassemble packages, and manage a multicast data transmission.

In the Bluetooth LE, three fixed channels (one for a signaling channel, one for a security manager, and one for an attribute protocol) are basically used, and dynamic channel may be used as necessary.

In contrast, in the BR/EDR, a dynamic channel is basically used, and a protocol service multiplexer, retransmission, streaming mode, and the like, are supported.

The SM 42 is a protocol for certifying a device and providing a key distribution.

The ATT 43 defines a rule for accessing data of a counterpart device by a server-client structure. The ATT 43 includes six types of messages (request, response, command, notification, indication, and confirmation) as follows.

Request and Response message: A request message is a message for a client device to request specific information from a server device, and the response message, as a response message with respect to the request message, refers to a message transmitted from the server device to the client device.

Command message: It is a message transmitted from the client device to the server device in order to indicate a command of a specific operation. The server device does not transmit a response with respect to the command message to the client device.

Notification message: It is a message transmitted from the server device to the client device in order to notify an event, or the like. The client device does not transmit a confirmation message with respect to the notification message to the server device.

Indication and confirmation message: It is a message transmitted from the server device to the client device in order to notify an event, or the like. Unlike the notification message, the client device transmits a confirmation message regarding the indication message to the server device.

In the present invention, when the GATT profile using the attribute protocol (ATT) 43 requests long data, a value regarding a data length is transmitted to allow a client to clearly know the data length, and a characteristic value may be received from a server by using a universal unique identifier (UUID).

The generic access profile (GAP) 45, a layer newly implemented for the Bluetooth LE technology, is used to select a role for communication between Bluetooth LED devices and to control how a multi-profile operation takes place.

Also, the generic access profile (GAP) 45 is mainly used for device discovery, connection generation, and security procedure part, defines a scheme for providing information to a user, and defines types of attributes as follows.

① Service: It defines a basic operation of a device by a combination of behaviors related to data ② Include: It defines a relationship between services ③ Characteristics: It is a data value used in a server ④ Behavior: It is a format that may be read by a computer defined by a UUID (value type).

The LE profile 46, including profiles dependent upon the GATT, is mainly applied to a Bluetooth LE device. The LE profile 46 may include, for example, Battery, Time, FindMe, Proximity, Time, Object Delivery Service, and the like, and details of the GATT-based profiles are as follows.

Battery: Battery information exchanging method
Time: Time information exchanging method
FindMe: Provision of alarm service according to distance
Proximity: Battery information exchanging method
Time: Time information exchanging method The generic attribute profile (GATT) 44 may operate as a protocol describing how the attribute protocol (ATT) 43 is used when services are configured. For example, the GATT 44 may operate to define how ATT attributes are grouped together with services and operate to describe features associated with services.

Thus, the GATT 44 and the ATT 43 may use features in order to describe status and services of a device and describe how the features are related and used.

Hereinafter, procedures of the Bluetooth low energy (BLE) technology will be briefly described.

The BLE procedure may be classified as a device filtering procedure, an advertising procedure, a scanning procedure, a discovering procedure, and a connecting procedure.

Device Filtering Procedure

The device filtering procedure is a method for reducing the number of devices performing a response with respect to a request, indication, notification, and the like, in the controller stack.

When requests are received from all the devices, it is not necessary to respond thereto, and thus, the controller stack may perform control to reduce the number of transmitted requests to reduce power consumption.

An advertising device or scanning device may perform the device filtering procedure to limit devices for receiving an advertising packet, a scan request or a connection request.

Here, the advertising device refers to a device transmitting an advertisement event, that is, a device performing an advertisement and is also termed an advertiser.

The scanning device refers to a device performing scanning, that is, a device transmitting a scan request.

In the BLE, in a case in which the scanning device receives some advertising packets from the advertising device, the scanning device should transmit a scan request to the advertising device.

However, in a case in which a device filtering procedure is used so a scan request transmission is not required, the scanning device may disregard the advertising packets transmitted from the advertising device.

Even in a connection request process, the device filtering procedure may be used. In a case in which device filtering is used in the connection request process, it is not necessary to transmit a response with respect to the connection request by disregarding the connection request.

Advertising Procedure

The advertising device performs an advertizing procedure to perform undirected broadcast to devices within a region.

Here, the undirected broadcast is advertizing toward all the devices, rather than broadcast toward a specific device, and all the devices may scan advertising to make an additional information request or a connection request.

In contrast, directed advertising may make an additional information request or a connection request by scanning advertising for only a device designated as a reception device.

The advertising procedure is used to establish a Bluetooth connection with an initiating device nearby.

Or, the advertising procedure may be used to provide periodical broadcast of user data to scanning devices performing listening in an advertising channel.

In the advertising procedure, all the advertisements (or advertisement events) are broadcast through an advertisement physical channel.

The advertising devices may receive scan requests from listening devices performing listening to obtain additional user data from advertising devices. The advertising devices transmit responses with respect to the scan requests to the devices which have transmitted the scan requests, through the same advertising physical channels as the advertising physical channels in which the scan requests have been received.

Broadcast user data sent as part of advertising packets are dynamic data, while the scan response data is generally static data.

The advertisement device may receive a connection request from an initiating device on an advertising (broadcast) physical channel. If the advertising device has used a connectable advertising event and the initiating device has not been filtered according to the device filtering procedure, the advertising device may stop advertising and enter a connected mode. The advertising device may start advertising after the connected mode.

Scanning Procedure

A device performing scanning, that is, a scanning device performs a scanning procedure to listen to undirected broadcasting of user data from advertising devices using an advertising physical channel.

The scanning device transmits a scan request to an advertising device through an advertising physical channel in order to request additional data from the advertising device. The advertising device transmits a scan response in response to the scan request, by including additional user data which has requested by the scanning device through an advertising physical channel.

The scanning procedure may be used while being connected to other BLE device in the BLE piconet.

If the scanning device is in an initiator mode in which the scanning device may receive an advertising event and initiates a connection request. The scanning device may transmit a connection request to the advertising device through the advertising physical channel to start a Bluetooth connection with the advertising device.

When the scanning device transmits a connection request to the advertising device, the scanning device stops the initiator mode scanning for additional broadcast and enters the connected mode.

Discovering Procedure

Devices available for Bluetooth communication (hereinafter, referred to as "Bluetooth devices") perform an advertising procedure and a scanning procedure in order to discover devices located nearby or in order to be discovered by other devices within a given area.

The discovering procedure is performed asymmetrically. A Bluetooth device intending to discover other device nearby is termed a discovering device, and listens to discover devices advertising an advertising event that may be scanned. A Bluetooth device which may be discovered by other device and available to be used is termed a discoverable device and positively broadcasts an advertising event such that it may be scanned by other device through an advertising (broadcast) physical channel.

Both the discovering device and the discoverable device may have already been connected with other Bluetooth devices in a piconet.

Connecting Procedure

A connecting procedure is asymmetrical, and requests that, while a specific Bluetooth device is performing an advertising procedure, another Bluetooth device should perform a scanning procedure.

That is, an advertising procedure may be aimed, and as a result, only one device may response to the advertising. After a connectable advertising event is received from an advertising device, a connecting request may be transmitted to the advertising device through an advertising (broadcast) physical channel to initiate connection.

Hereinafter, operational states, that is, an advertising state, a scanning state, an initiating state, and a connection state, in the BLE technology will be briefly described.

Advertising State

A link layer (LL) enters an advertising state according to an instruction from a host (stack). In a case in which the LL is in the advertising state, the LL transmits an advertising packet data unit (PDU) in advertising events.

Each of the advertising events include at least one advertising PDU, and the advertising PDU is transmitted through an advertising channel index in use. After the advertising PDU is transmitted through an advertising channel index in use, the advertising event may be terminated, or in a case in which the advertising device may need to secure a space for performing other function, the advertising event may be terminated earlier.

Scanning State

The LL enters the scanning state according to an instruction from the host (stack). In the scanning state, the LL listens to advertising channel indices.

The scanning state includes two types: passive scanning and active scanning. Each of the scanning types is determined by the host.

Time for performing scanning or an advertising channel index are not defined.

During the scanning state, the LL listens to an advertising channel index in a scan window duration. A scan interval is defined as an interval between start points of two continuous scan windows.

When there is no collision in scheduling, the LL should listen in order to complete all the scan intervals of the scan window as instructed by the host. In each scan window, the LL should scan other advertising channel index. The LL uses every available advertising channel index.

In the passive scanning, the LL only receives packets and cannot transmit any packet.

In the active scanning, the LL performs listening in order to be relied on an advertising PDU type for requesting advertising PDUs and advertising device-related additional information from the advertising device.

Initiating State

The LL enters the initiating state according to an instruction from the host (stack).

When the LL is in the initiating state, the LL performs listening on advertising channel indices.

During the initiating state, the LL listens to an advertising channel index during the scan window interval.

Connection State

When the device performing a connection state, that is, when the initiating device transmits a CONNECT_REQ PDU to the advertising device or when the advertising device receives a CONNECT_REQ PDU from the initiating device, the LL enters a connection state.

It is considered that a connection is generated after the LL enters the connection state. However, it is not necessary to consider that the connection should be established at a point in time at which the LL enters the connection state. The only difference between a newly generated connection and an already established connection is a LL connection supervision timeout value.

When two devices are connected, the two devices play different roles.

An LL serving as a master is termed a master, and an LL serving as a slave is termed a slave. The master adjusts a timing of a connecting event, and the connecting event refers to a point in time at which the master and the slave are synchronized.

Hereinafter, packets defined in an Bluetooth interface will be briefly described. BLE devices use packets defined as follows.

Packet Format

The LL has only one packet format used for both an advertising channel packet and a data channel packet.

Each packet includes four fields of a preamble, an access address, a PDU, and a CRC.

When one packet is transmitted in an advertising physical channel, the PDU may be an advertising channel PDU, and when one packet is transmitted in a data physical channel, the PDU may be a data channel PDU.

Advertising Channel PDU

An advertising channel PDU has a 16-bit header and payload having various sizes.

A PDU type field of the advertising channel PDU included in the heater indicates PDU types defined in Table 1 below.

TABLE 1

| PDU Type | Packet Name |
| --- | --- |
| 0000 | ADV_IND |
| 0001 | ADV_DIRECT_IND |
| 0010 | ADV_NONCONN_IND |
| 0011 | SCAN_REQ |
| 0100 | SCAN_RSP |
| 0101 | CONNECT_REQ |
| 0110 | ADV_SCAN_IND |
| 0111-1111 | Reserved |

Advertising PDU

The following advertising channel PDU types are termed advertising PDUs and used in a specific event.

ADV_IND: Connectable undirected advertising event

ADV_DIRECT_IND: Connectable directed advertising event

ADV_NONCONN_IND: Unconnectable undirected advertising event

ADV_SCAN_IND: Scannable undirected advertising event

The PDUs are transmitted from the LL in an advertising state, and received by the LL in a scanning state or in an initiating state.

Scanning PDU

The following advertising channel DPU types are termed scanning PDUs and are used in a state described hereinafter.

SCAN_REQ: Transmitted by the LL in a scanning state and received by the LL in an advertising state.

SCAN_RSP: Transmitted by the LL in the advertising state and received by the LL in the scanning state.

Initiating PDU

The following advertising channel PDU type is termed an initiating PDU.

CONNECT_REQ: Transmitted by the LL in the initiating state and received by the LL in the advertising state.

Data Channel PDU

The data channel PDU may include a message integrity check (MIC) field having a 16-bit header and payload having various sizes.

The procedures, states, and packet formats in the BLE technology discussed above may be applied to perform the methods proposed in this disclosure.

FIG. 5 is a view illustrating an example of a structure of a generic attribute profile (GATT) of Bluetooth low energy.

Referring to FIG. 5, a structure for exchanging profile data of Bluetooth low energy may be looked through.

In detail, the GATT defines a method for exchanging data using a service between Bluetooth LE devices and a characteristic.

In general, a peripheral device (for example, a sensor device) serves as a GATT server, and has definition regarding a service and a characteristic.

In order to read or write data, a GATT client sends a data request to the GATT server, and every operation (transaction) is started by the GATT client and a response is received from the GATT server.

A GATT-based operational structure used in the Bluetooth LE may be a vertical structure as illustrated in FIG. 5 based on a profile, a service, and a characteristic.

The profile includes one or more services, and the services may include one or more characteristics or other services.

The service serves to divide data into logical units and may include one or more characteristics or other services, each of the services has a 16-bit or 128-bit identifier called a universal unique identifier (UUID)).

The characteristic is the lowermost unit in the GATT-based operational structure. The characteristic includes only one data, and has a 16-bit or 128-bit UUID, similar to the service.

The characteristic is defined by values of various types of information, and in order to hold each information, an attribute may be required for each information. The characteristic may use several continuous attributes.

The attribute has four components and has meanings as follows.

handle: Address of attribute
Type: Type of attribute
Value: Value of attribute
Permission: Right to access attribute The present invention proposes a method in which a sensor measures and stores human activities by using a GATT-based operational structure of the Bluetooth LE, and a client retrieves the stored information from the sensor.

FIG. 6 is a flow chart illustrating a method for forming connection using Bluetooth low energy (LE) between devices.

As illustrated in FIG. 6, in order for a first device 300 to be BLE-connected to the second device 400, the first device 300 transmits an advertising messages to the second device 400 (S6010).

As discussed above, the advertising message is used to provide information of one device to another device utilizing BLE and may include various types of information such as service information provided by the one device, user information, and the like.

The second device 400 checks information included in the advertising message transmitted from the first device 300, transmits a connection request message for requesting BLE connection to the first device 300 (S6020), and the first device 300 and the second device 400 form BLE connection therebetween.

This method, however, is disadvantageous in that, without a user interface (UI) in the first device 300 and/or the second device 400, the first device 300 and the second device 400 may not be connected or have difficulty in connection and it is impossible to check a PIN number and control connection configuration.

Thus, in order to solve the problem, the present disclosure proposes a method for connecting the first device 300 and the second device 400 using a control device 500 having a UI for controlling connection between devices.

FIG. 7 is a view schematically illustrating a method for controlling formation of connection between other devices through a control device, to which the present disclosure is applicable.

As illustrated in FIG. 7, in order to form connection between the first device 300 and the second device 400, the control device 500 is required, and in order for the control device 500 to control the first device 300 and the second device 400, a new control protocol is required.

Also, in order to control connection between the first device 300 and the second device 400 through a gateway, a new protocol is required.

Here, in order to control a connection state of other devices, the control device 500 should know information (e.g., interface information, service information, etc.) of the other devices, and in order to obtain information of the other devices and perform controlling the control device 500 may directly obtain information of the other devices and perform controlling or may obtain information from the plurality of devices through a separate gateway and perform controlling.

Table 2 below illustrates an example of information required for controlling the other devices directly by the control device 500.

TABLE 2

ID of control device
Address IDs of master and slave devices controlled by control device
Service IDs (UUID: (Incomplete List or Complete List) and (16bit, 32bit or 128 bit Service UUID)of devices controlled by control device
Profile IDs (UUID: (Incomplete List or Complete List) and (16bit, 32bit or 128 bit Service UUID) of devices controlled by control device
Device state of device controlled by control device (Current Device State, Operated Device State)
Security information supported by device controlled by control device (Security Mode, Security Level)
Type information of wireless communication technique supported by device controlled by control device
Bonding information of device controlled by control device
Connection information of device controlled by control device Table 3 below illustrates an example of information required for the control device 500 to control other devices through a gateway.

TABLE 3

Service IDs (UUID: (Incomplete List or Complete List) and (16bit, 32bit or 128 bit Service UUID) supported by peripheral devices discovered by gateway
Profile IDs (UUID: (Incomplete List or Complete List) and (16bit, 32bit or 128 bit Service UUID) supported by peripheral devices discovered by gateway
ID of control device supported by peripheral devices discovered by gateway
State information of peripheral devices discovered by gateway (Current Device State, Operated Device State)
Security information supported by peripheral devices discovered by gateway (Security Mode, Security Level)
Type information of wireless communication technique supported by peripheral devices discovered by gateway
Bonding information of peripheral devices discovered by gateway
Connection information of peripheral devices discovered by gateway
Pairing information of peripheral devices discovered by gateway FIG. 8 is a flow chart illustrating an example of a method for controlling connection of devices through Bluetooth basic rate/enhanced data rate (BR/EDR) or a Bluetooth low energy (BLE) technique, to which the present disclosure is applicable.

Hereinafter, it is assumed that the control device 500 is connected to the first device 300 through BLE.

Referring to FIG. 8, the control device 500 may control connection by obtaining device information of the first device 300 and the second device 400 through Bluetooth BR/EDR.

In detail, the control device 500, the first device 300, and the second device 400 may be in standby, and in this state, the control device 500 enters an inquiry state for device discovery and the first device 300 and the second device 400 enters an inquiry scan state.

In the inquiry state, the controller 500 transmits an ID packet to perform a Bluetooth BR/EDR discovery procedure (S8010), and receives a frequency hop synchronization (FHS) packet from each of the first device 300 and the second device 400 in response (S8020).

Thereafter, in order to obtain information for controlling the first device 300 and the second device 400, the control device 500 transmits an ID packet requesting additional information to the first device 300 and the second device 400 (S8030).

Upon receiving the ID packet requesting additional information, the first device 300 and the second device 400 transmit an extended inquiry response (EIR) message including additional information to the control device 500 in response to the ID packet (S8040).

Table 4 below illustrates an example of the additional information.

TABLE 4

Manufacturer ID
Appearance
Class of Device
GAP Role
Shortened Device Friendly Name
Security Modes
Bonding Information
Profile IDs
Service IDs After checking presence and information of the first device 300 and the second device 400 through such a procedure, the control device 500 performs a paging procedure for connection to the first device 300 through Bluetooth BR/EDR.

In order to perform the paging procedure, the control device 500 enters a paging state and the first device 300 enters a paging scan state.

In the paging state, the control device 500 transmits a page ID packet to the first control device 300 and receives a page ID packet from the first device 300 (S8050).

Here, the control device 500 enters a master response state of the paging state, and the first device 300 enters a slave state of the paging state.

After exchanging the page ID packet, the control device 500 and the first device 300 are synchronized in frequency and connected in Bluetooth BR/EDR (S8060).

Thereafter, in order to request information related to a pairing state of the first device 300 and the second device 400, the control device 500 transmits a state information request message to the first device 300 and the second device 400 (S8070).

Upon receiving the state information request message, the first device 300 and the second device 400 transmit a state information response message including state information to the control device 500 in response (S8080).

The state information may be included by the number of pairing of each of the first device 300 and the second device 400.

Table 5 below illustrates an example of the state information.

TABLE 5

Pairing Status
Types of Pairing(Connection)
Master Device ID
Master Device's GAP Roles
Slave Device ID
Slave Device's GAP Roles
Paired Device's Manufacturer ID
Paired Device's ID
Paired Device's Appearance
Paired Device's Class of Device
Paired Device's Shortened Device Friendly Name
Number of Available Connections
Security Modes
Bonding Information
Profile IDs
Service IDs After obtaining information related to a pairing state of the first device 300 and the second device 400 through the state information response message, the control device 500 transmits a connection request message requesting connection with the second device 200 to the first device 300 (S8090).

Here, the connection request message includes information of a client device, i.e., the second device 400, for connection.

Upon receiving the connection request message, the first device 300 may perform Bluetooth BR/EDR connection with the second device 400 and exchange data (S8100).

After performing connection with the second device 400 through Bluetooth BR/EDR, the first device 300 transmits a connection response message including connection information of the first device 300, a result of connection with the second device 400, authority, and the like, to the control device 500 (S8110).

In this manner, the control device is able to obtain information from the first device 300 and the second device 400 through Bluetooth BR/EDR and/or BLE and control connection of the first device 300 and the second device 400.

FIGS. 9 and 10 are views illustrating an example of a method for scheduling a connection time of a device controlled through a Bluetooth BR/EDR and BLE technique and data types, to which the present disclosure is applicable.

Referring to FIGS. 9 and 10, the control device 500 may obtain information from the first device 300 and the second device 400 and schedule connection between the first device 300 and the second device 400.

First, step S9010 to step S9040 are the same as step S8010 to step S8040 of FIG. 8, and thus, descriptions thereof will be omitted.

After step S9040, the control device 500 transmits a connection request message requesting connection with the second device 400 to the first device 300 through BLE (S9050).

The control device 500 may transmit information illustrated in FIG. 10, that is, pairing configuration information such as information of the second device 400, a pairing start time at which the first device 300 starts to perform a procedure of pairing with the second device 400, a pairing end time at which the first device 300 terminates the procedure of pairing with the second device 400, day and date information at which pairing starts and ends, through the connection request message.

Upon receiving the connection request message from the control device 500, the first device 300 checks pairing configuration information included in the connection request message. For example, the first device 300 compares the pairing start time included in the connection request message and the current time, and when the current time is the same as the pairing start time or has passed, the first device 300 may perform a pairing procedure with the second device 400 so as to be connected (S9060).

When pairing and/or connection with the second device 400 is finished, the first device 300 transmits a connection response message including a connection result, connection information, and/or authority information to the control device 500 to inform the control device 500 about the connection with the second device 400 (S9070).

Thereafter, the first device 300 continuously checks the pairing end time, and when the current time is the same as the pairing end time or has passed, the first device 300 terminates connection with the second device 400 and transmits a connection response message to the control device 500 to inform the control device 500 about the termination of the connection with the second device 400 (S9090).

Here, the connection response message may include a connection termination result, connection information, and/or authority information.

FIG. 11 is a view illustrating an example of a method for controlling a plurality of devices through a single control device, to which the present disclosure is applicable.

Referring to FIG. 11, when a plurality of profiles or service UUIDs are supported in one pairing, the control device may separately control pairing by the profiles or services.

First, (a) a TV and a terminal as a control device are paired to use an audio streaming service. In this case, the control device may check a pairing state of each device through an output unit. (b) When a portion indicating a pairing state, that is, a portion indicating pairing between the terminal and the TV, is selected on a screen indicating a pairing state, services performed as devices are actually connected are specifically displayed as illustrated in (c). For example, in the case of audio streaming, audio channels are displayed as illustrated in (c).

Here, one of the displayed audio channels may be handed over to another device, and when handed over, audio channels 1 and 2 may be listened through the terminal and audio channel 3 may be listened through a sound bar as illustrated in (d).

In this manner, when a plurality of profiles or services are discovered, the profiles and services can be separately controlled.

FIG. 12 is a flow chart illustrating an example of a method for controlling connection of devices through a Bluetooth BR/EDR, to which the present disclosure is applicable.

Hereinafter, it is assumed that the control device 500 and the first device 300 and the control device 500 and the second device 400 are connected through Bluetooth BR/EDR.

Referring to FIG. 12, the control device 500 may obtain information related to pairing and/or connection from the first device 300 and the second device 400 through Bluetooth BR/EDR and set information required for connection of each device to control connection of each device.

In detail, the control device 500 may discover other paired devices, i.e., the first device 300 and the second device 400 (S12010).

Thereafter, the control device 500 may receive device information from each of the discovered first and second devices 300 and 400 (S12020).

The device information may include role information indicating a role of each device, a profile ID indicating a profile supported by each device, security information, and the like.

Upon receiving the device information from each of the first device 300 and the second device 400, the control device 500 searches for device role information to check whether there is a device for receiving a control message from the control device 500 and performing the same, and determines a device role of each device (S12030 and S12040).

For example, the control device 500 may determine the first device 300 as a master device and the second device 400 as a slave device.

Thereafter, the control device 500 matches profiles of the first device 300 as a master device and the second device 300 as a slave device to select a common profile and security mode (S12050 and S12060). When a common profile is not present, the first device 300 and the second device 400 may not be paired.

For example, in a case in which the first device 300 supports A2DP and AVRCP profiles for supporting audio streaming and PBAP and HPF profiles required for a call and the second device 400 supports only the A2DP and AVRCP profiles, the control device 500 may select the S2DP and AVRCP profiles, the common profiles.

Also, in a case in which the first device 300 supports security mode 1, security mode 2, security mode 3, and security mode 4, and the second device 400 supports security mode 4, the control device 500 may determine the security mode 4 as a security mode to be applied.

After determining the profile and security mode, the control device 500 transmits a connection request message requesting the first device 300 to perform pairing with the second device 400 to the first device 300 as a master device (S12070).

The connection request message may include at least one of a profile ID of a profile selected by the control device 500, a service ID, channel information to be used, and determined security mode information.

Upon receiving the connection request message from the control device 500, the first device 300 performs connection with the second device 400 according to information included in the connection request message (S12080) and transmits a connection response message including a connection result, connection information, and security information to the control device 500 (S12090).

Thereafter, the first device 300 and the second device 400 transmit and receive data through connected Bluetooth BR/EDR (S12100).

FIG. 13 is a flow chart illustrating an example of a method for controlling connection of controlled devices by obtaining information of the devices by a control device, to which the present disclosure is applicable.

Referring to FIG. 13, the control device 500 may control connection between a first device and a second device by setting information required for connection of each device by obtaining information related to pairing and/or connection from each device through BLE.

In detail, the control device 500 may discover paired other devices, that is, the first device 300 and the second device 400 through an advertising message transmitted from each of the first device 300 and the second device 400 (S13010).

Thereafter, the control device 500 may receive device information from each of the discovered first device 300 and the second device 400 (S13020).

The device information may include role information indicating a role of each device, a profile ID indicating a profile supported by each device, a service ID indicating a supported service, security information, and the like.

Upon receiving the device information from each of the first device 300 and the second device 400, the control device 500 searches for device role information to check whether there is a device for receiving a control message from the control device 500 and performing the same based on the received device information, and determines a device role of each device (S13030 and S13040).

For example, the control device 500 may determine the first device 300 as a central device and the second device 400 as a peripheral device.

Thereafter, the control device 500 may match profiles of the first device 300 as a central device and the second device 300 as a peripheral device 400 and select a common profile, service, and security mode (S13050 and S13060). If a common profile is not present, the first device 300 and the second device 400 may not be paired.

For example, in a case in which the first device 300 supports an indoor positioning service (IPS) as a profile for a location tracking device, a health device profile (HDP) as a profile for a health information measurement device, and a blood pressure profile (BLP) as a profile for a blood pressure measurement device, and the second device 400 supports only the IPS profile, the control device 500 may select the IPS profile, a common profile.

Also, in a case in which the first device 300 and the second device 400 support only an object transfer service (OTS), the control device 500 may select the OTS as a common service, and in a case in which the first device 300 supports security mode 1, security mode 2, security mode 3, and security mode 4, and the second device 400 supports security mode 4, the control device 500 may determine the security mode 4 as a security mode to be applied.

After determining the profile, service, and security mode, the control device 500 transmits a connection request message requesting the first device 300 to perform pairing with the second device 400 to the first device 300 as a master device (S13070).

The connection request message may include at least one of a profile ID of a profile selected by the control device 500, a service ID, and determined security mode information.

Upon receiving the connection request message from the control device 500, the first device 300 performs connection with the second device 400 according to information included in the connection request message through BLE (S13080) and transmits a connection response message including a connection result, connection information, and security information to the control device 500 (S13090).

Thereafter, the first device 300 and the second device 400 transmit and receive data through connected BLE (S13100).

FIG. 14 is a view illustrating an example of a method for controlling connection of a plurality of devices by a control device through a gateway, to which the present disclosure is applicable.

Referring to FIG. 14, a control device may control pairing of one or more devices through various wireless communication techniques even from a remote area, as well as at a short distance through a gateway supporting Bluetooth.

In detail, the gateway may support a plurality of wireless communication techniques (e.g., Wi-Fi, Ethernet, Internet, 3G, 4G, etc.), as well as Bluetooth.

The control device may control a plurality of devices through a gateway supporting a plurality of wireless communication techniques from within or outside through an AP or the Internet For example, the control device may request the gateway to discover devices supporting Bluetooth from an indoor or outdoor area, and the gateway may discover devices supporting Bluetooth nearby and transmit the discovery result to the control device.

The control device may request the gateway to pair with the discovered devices ad control pairing, and the gateway may update list information of the paired devices and transmit the updated list information to the control device.

Also, the control device may instruct the paired devices to perform a specific operation through the gateway and control the paired devices.

FIGS. 15 and 16 are views illustrating another example of a method for controlling connection of a plurality of devices by a control device through a gateway, to which the present disclosure is applicable.

Referring to FIGS. 15 and 16, the control device may directly control other devices through Bluetooth connection or control a plurality of devices through a gateway.

In detail, as illustrated in FIG. 15, a terminal, a control device, may directly control ON/OFF, color, ON/OFF time, and the like, of a device supporting Bluetooth, for example, an electric bulb supporting Bluetooth, through Bluetooth connection.

Also, when it is impossible for the control device to be directly connected to the device supporting Bluetooth, the control device may discover devices supporting Bluetooth through a gateway and control the discovered devices to be connected to the gateway to control the discovered devices.

Also, as illustrated in FIG. 16, since the terminal, a control device, supports a plurality of long-range wireless communication techniques (e.g., Wi-Fi, Ethernet, etc.) as well as Bluetooth even when it cannot be connected to the gateway through Bluetooth, the terminal may be connected to the gateway through the long-range wireless communication technique to control devices connected to the gateway through Bluetooth.

FIG. 17 is a flow chart illustrating an example of a method for controlling a plurality of devices by a control device through a gateway using Bluetooth BR/EDR and BLE, to which the present disclosure is applicable.

Referring to FIG. 17, the control device may obtain information through a gateway 600 and control pairing and connection of other devices through the obtained information.

The gateway 600 may obtain device information discussed above with reference to FIG. 12 through an advertising message from each of the first device 300 and a third device 700 supporting BLE (S17010), and obtain device information discussed above with reference to FIG. 12 through an extended inquiry response (EIR) message from the second device 400 supporting Bluetooth BR/EDR (S17020).

Thereafter, when a scan request message requesting additional information of paired devices from the control device 500 (S17030), the gateway 600 transmits a scan request message for requesting updating of pairing state information to the first device 300 and the third device 700 (S17040).

Upon receiving the scan request message, the first device 300 and the third device 700 transmit include pairing information indicating a current pairing state in a scan response message and transmit the same to the gateway 600 (S17050), and the gateway 600 updates pairing state information based on the pairing information transmitted from the first device 300 and the third device 700, includes the updated pairing state information in a scan response message, and transmits the scan response message to the control device 500 (S17060).

Upon receiving the updated pairing state information of the devices from the gateway 600, the control device 500 transmits a connection request message requesting the first device 300 to perform connection with the second device 400 through Bluetooth BR/EDR to the gateway 600 (S17070).

Upon receiving the connection request message from the control device 500, the gateway 600 transmits a connection request message requesting the first device 300 to perform connection with the second device 400 through Bluetooth BR/EDR to the first device 300 (S17080).

The first device 300 performs connection with the second device 400 performs connection with the second device 400 through Bluetooth BR/EDR according to the request message transmitted from the gateway 600 and performs data transmission/reception through Bluetooth BR/EDR (S17090).

Thereafter, the first device 300 transmits a connection result, connection information of the first device 300, and authority information to the gateway through a connection response message (S17100), and the gateway 600 transmits the received connection response message to the control device 500 (S17110).

In this manner, the control device 500 is able to control the other devices through the gateway even when it cannot control the other devices directly.

FIG. 18 is a flow chart illustrating an example of a method for controlling a plurality of devices by a control device through a gateway using a wide area network technique, to which the present disclosure is applicable.

Referring to FIG. 18, unlike the case of FIG. 17, even in a case in which the control device 500 cannot be connected to the gateway 600 through Bluetooth, the control device 500 may be connected to the gateway 600 through any other wireless communication technique and control other devices through the gateway.

In this embodiment, it is assumed that the gateway has obtained pairing state information of the first device 300, the second device 400, and the third device 700.

In a case in which the control device 500 cannot perform communication with the gateway 600 through Bluetooth, for example, in a case in which the control device 500 is present in a location farther than a communication available distance based on Bluetooth, the control device 500 may perform communication with the gateway 600 through a long-range wireless communication technique such as Wi-Fi, Ethernet, 3G, LTE, and the like.

Through the long-range wireless communication technique, the control device 500 transmits a state information request message requesting pairing state information of other devices to the gateway 600 (S18020).

The gateway 600 includes pairing state information of the first device 300, the second device 400, and the third device 700 which has been already obtained in a state information response message and transmits the state information response message to the control device 500 in response (S18040).

Thereafter, the control device 500 determines a pairing target device and a wireless communication technique to be used for pairing and transmits a pairing request message requesting pairing of the pairing target device to the gateway 600 (S18060).

Hereinafter, a case in which the control device 500 transmits a pairing request message requesting the first device 300 and the third device 700 to perform pairing through BLE, to the gateway will be described as an example.

Upon receiving the pairing request message from the control device 500, the gateway 600 transmits the pairing request message to the first device 300 to request the first device 300 to perform pairing with the third device 700 through BLE (S18070).

Thereafter, the first device 300 performs pairing with the third device 700 through BLE to exchange data with the third device 700 (S18080).

The first device 300 may include a result of pairing with the third device 700, connection information of the first device 300, and authority information in a pairing response message and transmit the pairing response message to the gateway 600 (S18090), and the gateway 600 may include the received information in a pairing response message and transmit the same to the control device 500 through the long-range wireless communication technique (S18100).

In this manner, the control device is able to control other devices even when the control device cannot perform communication with the gateway through Bluetooth.

FIGS. 19 and 20 are views illustrating an example of a method for controlling connection of devices through BLE and a data format, to which the present disclosure is applicable.

Referring to FIGS. 19 and 20, the control device may obtain information of devices through BLE and control connection of devices based on the obtained information.

In detail, the control device 500 may obtain information of a wireless communication interface supported by the first device 300 and the second device 400 from each of the devices through an advertising message (S19010).

Here, the information of the wireless communication interface transmitted through the advertising message may be transmitted in the form of a bit mask.

The form of a bit mask indicates which wireless communication interface the first device 300 and the second device 400 support and which service the first device 300 and the second device 400 support, in the form of bit.

Table 6 below illustrates an example of the bit mask, and Table 7 illustrates an example of types of wireless communication interface and services indicated by respective bits.

TABLE 6

| $7^{th}$ bit | $6^{th}$ bit | $5^{th}$ bit | $4^{th}$ bit | $3^{rd}$ bit | $2^{nd}$ bit | $1^{st}$ bit |
|---|---|---|---|---|---|---|
| 0 | 1 | 0 | 1 | 1 | 1 | 0 |

TABLE 7

| Bit | Network Interface |
|---|---|
| $1^{st}$ bit | Wi - Fi |
| $2^{nd}$ bit | Wi - Fi Direct |
| $3^{rd}$ bit | WFDS Print |
| $4^{th}$ bit | WFDS Display |
| $5^{th}$ bit | Wi - Fi Display |
| $6^{th}$ bit | NFC |
| $7^{th}$ bit | Classic Bluetooth |
| $8^{th}$ bit | WiGig |
| $9^{th}$ bit | Zigbee |
| $10^{th}$ bit | Future Interface |

Through the bit values of the bit mask of Table 6, the first device 300 and the second device 400 may inform the control device 500 about a wireless communication interface or a service that they can support.

That is, in Table 6, since values of second, third, fourth, and sixth bits are 1, the first device 300 and the second device 400 is able to inform the control device 500 that they can support Wi-Fi Direct, WFDS Print, WFDS Display, and NFC.

Upon receiving the information of the wireless communication interface, the control device 500 may perform connection with the first device 300 through BLE (S1920).

Thereafter, when detailed information (or additional information) regarding a wireless communication interface is required, the control device 500 may request detailed information (or additional information) regarding a wireless communication interface from the first device 300 (S19030).

Upon receiving the request for detailed information from the control device 500, the first device 300 may transmit the requested detailed information (or additional information) regarding a wireless communication interface to the control device 500.

The detailed information may include detailed information of a wireless communication device or detailed information (or additional information) of a service provided by a wireless interface.

As illustrated in FIG. 20, the detailed information may include an information type field indicating a type of information and a detailed information field including details of information. For example, in a case in which the control device 500 requests detailed information of Classic Bluetooth from the first device 300, the first device 300 may transmit detailed information of Classic Bluetooth to the control device 500 using the data format of FIG. 20.

In detail, in a case in which the first device 300 wants to transmit detailed information regarding an address and a device type for Classic Bluetooth connection to the control device 500, a value indicating information of an address or a type of device may be included in the information type, and a value indicating an address value or a device type may be included in the detailed information.

Upon receiving the detailed information from the first device 300, the control device 500 transmits a connection request message requesting performing connection with the second device 400 to the first device 300 (S19050).

The connection request message may include information of a device to which the first device 300 performs connection, authority information, wireless communication technique information, and service information.

Hereinafter, a case in which the wireless communication technique information is Wi-Fi will be described as an example.

Upon receiving the connection request message, the first device 300 performs connection with the second device 400 through Wi-Fi (S19060) and transmits a connection result and connection information and authority information to the control device 500 through a connection response message (S19070).

Thereafter, in a case in which the control device 500 wants to release the Wi-Fi connection between the first device 300 and the second device 400, the control device 500 transmits a connection release request message requesting release of Wi-Fi connection with the second device 400 to the first device 300 (S19080).

The connection release request message may include information of a device for releasing connection, authority information, information of a wireless communication technique to be released, and service information.

Upon receiving the connection release request message, the first device 300 releases Wi-Fi connection with the second device 400 (S19090) and transmits a connection release result and connection information and authority information to the control device 500 through a connection release response message (S19100).

FIG. 21 is a flow chart illustrating another example of a method for controlling connection of devices through Bluetooth BR/EDR, to which the present disclosure is applicable.

Referring to FIG. 21, the control device 500 may obtain information of devices through Bluetooth BR/EDR and control connection of devices based on the obtained information.

In detail, the control device 500 may transmit an inquiry message requesting information of a wireless communication interface supported by the first device 300 and the second device 400 to each of the devices (S21010), and the first device 300 and the second device 400 may transmit information of a wireless communication interface supported by each device to the control device 500 through an EIR message (S21020).

Here, information of the wireless communication interface transmitted through the EIR message may be transmitted in the form of a bit mask described above with reference to FIG. 19.

Upon receiving the information of a wireless communication interface, the control device 500 may perform connection with the first device 300 through Bluetooth BR/EDR (S21030).

Thereafter, when detailed information (or additional information) regarding the wireless communication interface is required, the control device 500 may request detailed information (or additional information) regarding a wireless communication interface from the first device 300 (S21040).

Upon receiving the request for detailed information from the control device 500, the first device 300 may transmit detailed information (or additional information) regarding the wireless communication interface described above with reference to FIGS. 19 and 20 to the control device 500 (S21050).

Upon receiving the detailed information from the first device 300, the control device 500 transmits a connection request message requesting performing connection with the second device 400 to the first device 300 (S21060).

The connection request message may include information of a device to which the first device 300 performs connection, authority information, wireless communication technique information, and service information.

Hereinafter, a case in which the wireless communication technique information is Wi-Fi will be described as an example.

Upon receiving the connection request message, the first device 300 performs connection with the second device 400 through Wi-Fi (S21070) and transmits a connection result and connection information and authority information to the control device 500 through a connection response message (S21080).

Thereafter, in a case in which the control device 500 wants to release the Wi-Fi connection between the first device 300 and the second device 400, the control device 500 transmits a connection release request message requesting release of Wi-Fi connection with the second device 400 to the first device 300 (S21090).

The connection release request message may include information of a device for releasing connection, authority information, information of a wireless communication technique to be released, and service information.

Upon receiving the connection release request message, the first device 300 releases Wi-Fi connection with the second device 400 (S21000) and transmits a connection release result and connection information and authority information to the control device 500 through a connection release response message (S21110).

FIG. 22 is a view illustrating an example of a method for controlling devices using Bluetooth BR/EDR or BLE, to which the present disclosure is applicable.

Referring to FIG. 22, a control device may control paired devices through a control function of each of the devices.

In detail, the control device may discover a nearby device that can be connected and a connected device and display the same through an output unit, and when a specific device is selected from the discovered devices, the control device may automatically display a control function of the selected device or may download the control function from the selected device and display the same.

For example, when an audio set and a TV are paired, the control device may discover and display the audio set and the TV, and (a) when the TV is selected, the control device may automatically display a control function for controlling the TV or may download the control function from the TV and display the same on a screen, and control the TV through the control function.

(b) Also, when the audio set is selected, the control device may automatically display a control function for controlling the audio set or may download the control function from the audio set and display the same on a screen, and control the audio set through the control function.

While the present disclosure has been shown and described in connection with the embodiments, it will be apparent to those skilled in the art that modifications and variations can be made without departing from the spirit and scope of the invention as defined by the appended claims.

The invention claimed is:

1. A method for controlling a connection between a first device and a second device using a short range wireless communication technology by a control device, the method comprising:
obtaining a first device information related to the first device from the first device;
obtaining a second device information related to the second device from the second device;
transmitting a connection request message for requesting connection with the second device to the first device based on the first device information and the second device information,
wherein the first device information includes a first role information indicating a role of the first device or at least one of one or more first profile IDs indicating profiles supportable by the first device, and the second device information includes a second role information indicating a role of the second device or at least one of one or more second profile IDs indicating profiles supportable by the second device,
wherein the first device information further includes at least one of a type information indicating a type of the first device, a first bonding information indicating a bonding state of the first device, a first connection information indicating a connection state of the first device, or a first security mode information indicating a security mode supported by the first device, and
wherein the second device information further includes at least one of a type information indicating a type of the second device, a second bonding information indicating a bonding state of the second device, a second connection information indicating a connection state of the second device, or a second security mode information indicating a security mode supported by the second device;
receiving a first response message including a result of connection with the second device in response to the connection request message; and
determining a third security mode information based on the first security mode information and the second security mode information,
wherein the connection request message further includes the third security mode information.

2. The method of claim 1, further comprising:
selecting one or more common profile IDs from among the one or more first profile IDs and the one or more second profile IDs.

3. The method of claim 2, wherein the connection request message includes the one or more common profile IDs.

4. The method of claim 1, wherein the connection request message further includes start time information indicating a time at which the first device starts a connection procedure with the second device and an end time information indicating a time at which the connection procedure terminates.

5. The method of claim 1, further comprising:
when the connection of the first device and the second device terminates, receiving a second response message including state information indicating the connection state of the first device.

6. The method of claim 1, wherein the method is performed through a basic rate/enhanced data rate (BR/EDR) mode of the short range wireless communication technology or low energy mode of the short range wireless communication technology.

7. A device, as a control device, for controlling a connection between a first device and a second device using a short range wireless communication technology, the device comprising:
a communication unit performing exterior communication wirelessly or wiredly; and
a processor functionally connected to the communication unit,
wherein the processor is configured to:
obtain a first device information related to the first device from the first device,
obtain a second device information related to the second device from the second device,
transmit a connection request message, using the communication unit, for requesting connection with the second device to the first device based on the first device information and the second device information, and
receive a first response message including a result of connection with the second device in response to the connection request message,
wherein the first device information includes a first role information indicating a role of the first device or at least one of one or more first profile IDs indicating profiles supportable by the first device, and the second device information includes a second role information indicating a role of the second device or at least one of one or more second profile IDs indicating profiles supportable by the second device,
wherein the processor is further configured to select one or more common profile IDs from among the one or more first profile IDs and the one or more second profile IDs,
wherein the connection request message includes one or more common profile IDs,
wherein the processor is further configured to determine a third security mode information based on a first security mode information and a second security mode information, and
wherein the connection request message further includes the third security mode information.

8. The device of claim 7, wherein
the first device information further includes at least one of a type information indicating a type of the first device, a first bonding information indicating a bonding state of the first device, a first connection information indicating a connection state of the first device, or the first security mode information indicating a security mode supported by the first device, and the second device information further includes at least one of a type information indicating a type of the second device, a second bonding information indicating a bonding state of the second device, a second connection information indicating a connection state of the second device, or the second security mode information indicating a security mode supported by the second device.

9. The device of claim 7, wherein the connection request message further includes start time information indicating a time at which the first device starts a connection procedure with the second device and an end time information indicating a time at which the connection procedure terminates.

10. The device of claim 7, wherein when the connection of the first device and the second device terminates, the processor is further configured to receive a second response message including state information indicating a connection state of the first device.

11. The device of claim 7, wherein the processor performs controlling through a basic rate/enhanced data rate (BR/EDR) mode of the short range wireless communication technology or a low energy mode of the short range wireless communication technology.

* * * * *